US010568046B1

(12) United States Patent
Gupta et al.

(10) Patent No.: US 10,568,046 B1
(45) Date of Patent: Feb. 18, 2020

(54) HOMOGENEOUS SYSTEM DETERMINATION IN A NETWORK

(71) Applicant: Motorola Mobility LLC, Chicago, IL (US)

(72) Inventors: Ranjeet Gupta, Bangalore (IN); Mary Khun Hor-Lao, Chicago, IL (US); Binesh Balasingh, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/052,465

(22) Filed: Aug. 1, 2018

(51) Int. Cl.
*H04B 7/00* (2006.01)
*H04W 52/24* (2009.01)
*H04L 29/06* (2006.01)
*H04W 24/10* (2009.01)

(52) U.S. Cl.
CPC ........... *H04W 52/245* (2013.01); *H04L 69/18* (2013.01); *H04W 24/10* (2013.01)

(58) Field of Classification Search
CPC ...... H04W 52/245; H04W 24/10; H04L 69/18
See application file for complete search history.

(56) References Cited

U.S. PATENT DOCUMENTS

| | | | |
|---|---|---|---|
| 2009/0054002 A1 | 2/2009 | Urushihara et al. | |
| 2013/0006435 A1* | 1/2013 | Berrios | F24S 50/20 700/295 |
| 2013/0107824 A1* | 5/2013 | Cherian | H04W 76/11 370/329 |
| 2014/0071902 A1 | 3/2014 | Sorrentino et al. | |
| 2014/0198637 A1* | 7/2014 | Shan | H04W 52/243 370/229 |
| 2014/0334374 A1 | 11/2014 | Hyde et al. | |
| 2015/0016298 A1* | 1/2015 | Ganichev | H04L 43/026 370/253 |
| 2015/0055492 A1 | 2/2015 | Gao, Jr. et al. | |
| 2015/0230145 A1 | 8/2015 | Lee | |
| 2015/0351084 A1* | 12/2015 | Werb | H04W 4/70 370/329 |

(Continued)

OTHER PUBLICATIONS

"What is the difference between SSID and BSSID?", Retrieved at: https://community.arubanetworks.com/t5/Wireless-Access/what-is-the-difference-between-SSID-and-BSSID/td-p/156842—on Oct. 24, 2018, 8 pages.

(Continued)

*Primary Examiner* — Md K Talukder
(74) *Attorney, Agent, or Firm* — SBMC

(57) ABSTRACT

In aspects of homogeneous and heterogeneous system determination in a network, a device can receive a first management frame and a second management frame communicated in separate data messages using a common communication protocol. The device implements a system identification module that can detect the first and second management frames are communicated in data messages from a radio device. The system identification module can determine that the first and second management frames are communicated from a homogeneous system that includes the radio device based at least in part on source addresses included in the first and second management frames. The system identification module can then determine to associate with the homogeneous system based on an operational state of services associated with either the first or the second management frames.

20 Claims, 13 Drawing Sheets

(56) References Cited

U.S. PATENT DOCUMENTS

2017/0048788 A1* 2/2017 Chen ...................... H04L 29/08

OTHER PUBLICATIONS

Aldan,"Marauder's Map: Sniffing MAC addresses in the MIT wireless network", May 12, 2016, 14 pages.
Chandra,"MultiNet: Connecting to Multiple IEEE 802.11 Networks Using a Single Wireless Card", In Proceedings: IEEE INFOCOM, The 23rd Annual Joint Conference of the IEEE Computer and Communications Societies, Mar. 7, 2004, 12 Pages.
Cunche,"I know your MAC Address: Targeted tracking of individual using Wi-Fi", Oct. 3, 2013, 18 pages.
Korakis,"Link Quality based Association Mechanism in IEEE 802.11h compliant Wireless LANs", Jan. 2005, 6 pages.
P,"Why does the AP have multiple MAC addresses?", Retrieved at: https://help.cloudtrax.com/hc/en-us/articles/206546684-Why-does-the-AP-have-multiple-MAC-addresses-, Feb. 28, 2017, 2 pages.
Vanhoef,"Why MAC Address Randomization is not Enough: An Analysis of Wi-Fi Network Discovery Mechanisms", May 30, 2016, 12 pages.
Beaver,"Power-Aware In-Network Query Processing for Sensor Data", Jan. 2003, 17 pages.
Hanschke,"Challenges of WiFi-Enabled and Solar-Powered Sensors for Smart Ports", Nov. 2016, 6 pages.
Mondal,"Power Efficient Router Architecture for Wireless Network-on-Chip", Mar. 2016, 7 pages.
Niesen,"Inter-Vehicle Range Estimation from Periodic Broadcasts", Jul. 7, 2016, 16 pages.
Panic,"Architecture of a Power-Gated Wireless Sensor Node", Sep. 2008, pp. 844-849.
Pering,"Exploiting Radio Hierarchies for Power-Efficient Wireless Device Discovery and Connection Setup", VLSID '05, Jan. 3-7, 2005, Jan. 3, 2005, 6 pages.
Rozner,"NAPman: Network-Assisted Power Management for WiFi Devices", Jun. 15, 2010, 15 pages.
Nychis,"Using Your Smartphone to Detect and Map Heterogeneous Networks and Devices in the Home", Proceedings of the 1st ACM workshop on Hot topics in wireless, Sep. 11, 2014, pp. 31-35.
"Non-Final Office Action", U.S. Appl. No. 16/506,131, dated Dec. 23, 2019, 13 pages.

* cited by examiner

HOMOGENEOUS SYSTEM DETERMINATION IN A NETWORK

BACKGROUND

Devices such as smart devices, Internet of Things (IoT) devices, wireless access points, devices used in various industries, consumer electronics, and the like are deployed in many different ways to implement various services. These devices are implemented for use in a wide range of industries and can be found in clothing, houses, buildings, campuses, factories, and the human body. The devices may use various networking technologies and protocols to communicate with other devices, servers, and/or cloud systems. Typically, the devices publish services as part of management frames (e.g., beacons, probe requests, discovery frames, and peer-to-peer frames) that are broadcast, which suggests to a device that receives the management frames to respond. Some management frames can be active frames that request a response from a receiving device, such as in the form of a probe response, discovery response, etc. Situations may arise where the receiving device is in an idle or sleep state and receives management frames that requests a response. The receiving device may then transition from the idle state to an active state in order to respond to the received management frames, or the response from the device can be performed by firmware of the device to enable the device to remain in the idle state and still respond to the received management frames. However, in many cases, responses from the receiving device to the various broadcast management frames are not required, which results in unnecessary communications that can congest network bandwidth, as well as drain battery power of the device.

BRIEF DESCRIPTION OF THE DRAWINGS

Implementations of homogeneous and heterogeneous system determination in a network, as well as heterogeneous system determination in a network, are described with reference to the following Figures. The same numbers may be used throughout to reference like features and components shown in the Figures.

DETAILED DESCRIPTION

Figure 1:
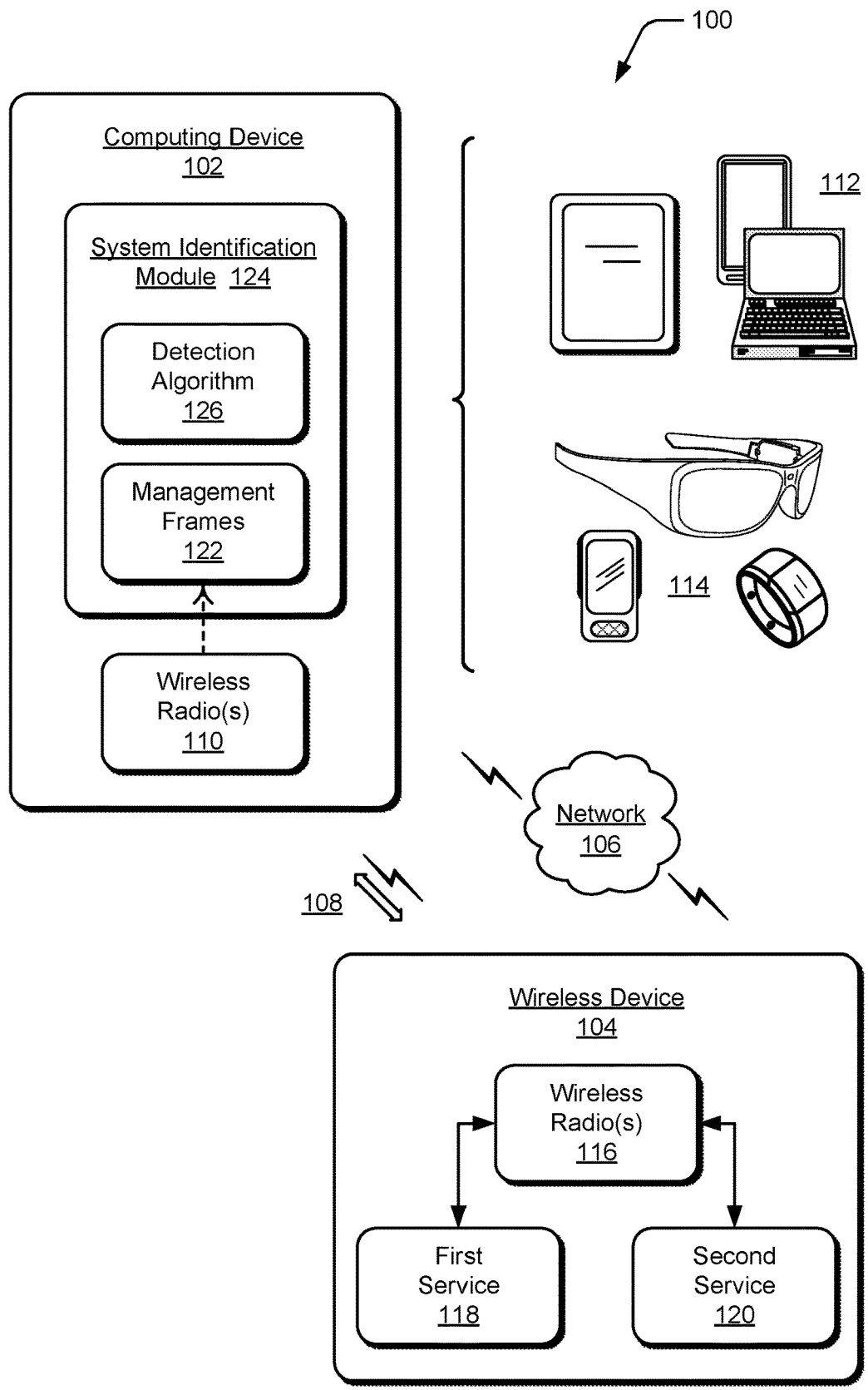
FIG. 1 illustrates an example system that can be used to implement techniques of homogeneous system determination in a network, and heterogeneous system determination in a network, as described herein.

Implementations of homogeneous and heterogeneous system determination in a network are described, and provide techniques to determine whether management frames received in separate data messages are communicated from a homogeneous system or a heterogeneous system, and whether to associate with the homogeneous system or the heterogeneous system for data communication. For example, a mobile device (e.g., mobile phone, laptop, computing device, etc.) can receive management frames from one or more other devices via a network or via direct peer-to-peer communication. The management frames can be received as unicast, multicast, or broadcast packets transmitted from one or more of the other devices. The management frames can be any type of data frame that announces services or information regarding a respective one of the other devices, or the management frames can request information from the mobile device.

Generally, a network can include multiple devices or systems, such as Internet of Things (IoT) devices, smart devices, access points, consumer electronics, and the like, that transmit management frames to request information from the mobile device, and the mobile device can then respond to the management frames with the requested information. However, this can lead to unnecessary battery drain of the mobile device by responding to all of the management frames received from the multiple devices or systems. Additionally, the mobile device responding to all of the management frames received from the multiple devices or systems congests network bandwidth and adds unnecessary noise on the communication medium. Further, the multiple devices or systems are susceptible to malicious code and compromised devices or systems can be utilized for purposes that risk users' privacy. Although generally described in the context of mobile and/or wireless devices, the features and aspects of homogeneous and heterogeneous system determination in a network may be applied to the use case of a computing device (e.g., desktop computer or other PC) that is connected via Ethernet cable, and which may be detected as attempting to spoof data packages.

In aspects of homogeneous and heterogeneous system determination in a network, a mobile device, such as any type of electronic and/or computing device, can be implemented to determine that management frames received using a common communication protocol in separate data messages are communicated from a homogeneous system, and the mobile device can determine whether to associate with the homogeneous system for data communication. Generally, as a type of computing device, the mobile device implements a system identification module that can detect whether the management frames are communicated from a radio device or multiple radio devices of a same device system or homogeneous system based on source addresses included in the management frames. The system identification module can then determine to associate with the homogeneous system based on an operational state of services associated with the management frames.

For example, an IoT device can have two pre-programmed medium access control (MAC) addresses (i.e., source addresses), where each MAC address is associated with a different service, such as one MAC address associated with a printer service and another MAC address associated with a voice operated service (e.g., Google Assistant, Amazon Alexa, or Apple Siri). The mobile device can receive a first management frame having a source address associated with the printer service, and receive a second management frame having a source address associated with the voice operated service. The mobile device can respond to the first management frame and/or the second management frame, and determine an operational state of the printer service and/or the voice operated service. If the mobile device detects that the backend server or network connectivity for either one of the services (e.g., the printer or voice operated service) is not responding or not working, then the mobile device can infer that the other service is also not working due to a backend or network connectivity issue. The system identification module can detect these issues associated with the services of the IoT device, and determine to ignore the first and second management frames based on the operational state of the services provided by the IoT device by not responding, which saves battery power of the mobile device.

The system identification module can also determine that management frames received using a common communication protocol in separate data messages are communicated from a homogeneous system based on various signatures of the management frames. The signatures of a management frame may include an organizationally unique identifier (OUI), a non-OUI portion, a received signal strength indicator (RSSI) value signature, a transmit power control (TPC) report, a location, and/or timing measurements. Any one or combination of the signatures of the management frame can be utilized as a basis for the determination that the management frames received using a common communication protocol are communicated from a homogeneous system, as described herein. For example, a dual-band access point that provides Wi-Fi on both 2.4 GHz and 5.0 GHz frequencies has an associated MAC address for each radio. The system identification module of the mobile device can perform an OUI lookup of MAC addresses included in the received management frames from the access point that indicates a manufacturer or organization. If the OUI lookup of the MAC addresses, or the non-OUI portion (up to 16/32 bits difference), indicate the same manufacturer or vendor, then the system identification module can infer that the received management frames are communicated from a same device system or a homogeneous system, and determine whether to associate with the access point.

The system identification module can also add identified homogeneous systems to a block list or to an allow list. Homogeneous systems that have been added to the block list causes the mobile device to ignore management frames received from homogeneous systems identified in the block list. Homogeneous systems that have been added to the allow list causes the mobile device to respond to management frames received from homogeneous systems identified in the allow list.

The features of homogeneous system determination in a network described herein enables a mobile device to identify a homogeneous system having multiple radios using a common communication protocol, or identify a homogeneous system having a single radio which rotates MAC addresses periodically. The mobile device can then allow or block interaction with the homogeneous system based on an operational state of services provided by the homogeneous system or network connectivity and/or availability of the homogeneous system. By blocking interaction with the homogeneous system, battery power of the mobile device is conserved, as well as reduction of response frames and data via the communication medium, which serves to alleviate network congestion. Additionally, an operational state of services provided by the homogeneous system or network connectivity and/or availability of the homogeneous system can be reported back to a computing device or administrator of the network.

In aspects of heterogeneous system determination in a network, a mobile device, such as any type of electronic and/or computing device, can be implemented to determine that management frames received using different communication protocols in separate data messages are communicated from a heterogeneous system, and the mobile device can determine whether to associate with the heterogeneous system for data communication. Generally, as a type of computing device, the mobile device implements a system identification module that can detect whether the management frames received using different communication protocols are communicated from different radio devices of a same device system or from a heterogeneous system in the network based on source addresses included in the management frames. The system identification module can then determine to associate with the heterogeneous system based on an operational state of services associated with the received management frames.

For example, a wireless device, such as an IoT device or a wireless access point, can have two different radios that communicate with the mobile device using different communication protocols. The two different radios may be a Wi-Fi radio and a Bluetooth™ radio, such that each radio is associated with a different pre-programmed MAC address (i.e., source address). The mobile device can receive a first management frame whose source address is associated with the Wi-Fi radio, and receive a second management frame whose source address is associated with the Bluetooth™ radio. The mobile device can respond to the first management frame and/or the second management frame, and determine an operational state of the services provided by the IoT device via the Wi-Fi radio and the Bluetooth™ radio. If the mobile device detects that the backend server or a network connection for either one of the services is not responding or not working, then the mobile device can infer that the other service is also not working due to a backend issue or the network connection. The system identification module can detect these issues associated with the IoT device, and determine to ignore the first and second management frames which saves battery power of the mobile device.

The system identification module can also determine that management frames received using different communication protocols in separate data messages are communicated from a heterogeneous system based on various signatures of the management frames. The signatures of a management frame may include an organizationally unique identifier (OUI), a received signal strength indicator (RSSI) value, a transmit power control (TPC) report, a location, and/or timing measurements. Any one or combination of the signatures of the management frame can be utilized as a basis for the determination that the management frames received using different communication protocols are communicated from a same device system or a heterogeneous system, as described herein.

For example, a wireless access point may include at least one Wi-Fi radio and a Bluetooth™ radio. The wireless access point uses a single chipset that includes both the Wi-Fi and Bluetooth™ radios, and source addresses corresponding to MAC addresses of the respective Wi-Fi and Bluetooth™ radios have the same OUI. The system identification module of the mobile device can perform an OUI lookup of MAC addresses included in the received management frames from the wireless access point that indicates a manufacturer or organization. If the OUI lookup of the MAC addresses indicate the same manufacturer or vendor, then the system identification module can infer that the management frames received using different communication protocols are communicated from a same device system or heterogeneous system. The system identification module can then determine whether to associate with the access point based on an operational state of the services provided by the wireless access point.

The system identification module can also add identified heterogeneous systems to a block list or to an allow list. Heterogeneous systems that have been added to the block list causes the mobile device to ignore management frames received using different communication protocols from heterogeneous systems identified in the block list. Heterogeneous systems that have been added to the allow list causes the mobile device to respond to management frames received using different communication protocols from heterogeneous systems identified in the allow list.

The features of heterogeneous system determination in a network described herein enables a mobile device to identify a heterogeneous system having multiple different radios using different communication protocols. The mobile device can then allow or block interaction with the heterogeneous system based on an operational state of services provided by the heterogeneous system or network connectivity and/or availability of the heterogeneous system. By blocking interaction with the heterogeneous system, battery power of the mobile device is conserved, as well as maintaining user privacy. Additionally, an operational state of services provided by the heterogeneous system or network connectivity and/or availability of the heterogeneous system can be reported back to a computing device or administrator of the network.

While features and concepts of homogeneous and heterogeneous system determination in a network can be implemented in any number of different devices, systems, environments, and/or configurations, implementations of homogeneous and heterogeneous system determination in a network are described in the context of the following example devices, systems, and methods.

FIG. 1 illustrates an example system 100 that can be used to implement techniques of homogeneous system determination in a network, as well as heterogeneous system determination in a network, as described herein. In this example, the system 100 includes a computing device 102 and a wireless device 104 that can communicate with each other via a network 106 (e.g., WLAN) or via a direct peer-to-peer connection 108 (e.g., Wi-Fi Direct, Bluetooth™, RFID, etc.). The computing device 102 may be any type of electronic, computing, and/or wireless device, such as a mobile phone or tablet device, that includes one or more wireless radios 110. Examples of electronic and/or computing devices 112 depicted in FIG. 1 include a mobile phone, laptop, or tablet device. The electronic and/or computing devices described herein may also be configured as a wearable device 114 that is designed to be worn by, attached to, carried by, or otherwise transported by a user. Examples of the wearable devices 114 depicted in FIG. 1 include glasses, a smart band or watch, and media playback device, such as clip-on fitness device, media player, or tracker. Other examples of wearable devices 114 include, but are not limited to, badges, a key fob, an access card, and a ring, an article of clothing, a glove, or a bracelet, to name a few examples.

Similarly, the wireless device 104 may be any type of electronic and/or computing device that includes one or more wireless radios 116. The wireless device 104 can be implemented to provide various services, such as a first service 118 and a second service 120 that can be published to the computing device 102 and other devices within communication range of the wireless radios 116 of the wireless device. Alternatively or in addition, the wireless device 104 can provide the services 118, 120 to the computing device 102 and other devices that are communicatively accessible via the network 106. The services 118, 120 can be published by transmitting data messages that include management frames 122 via the one or more wireless radios 116 of the wireless device 104 using the network 106, or via the direct peer-to-peer connection 108. Examples of the wireless device 104 include smart home devices, Internet of Things (IoT) devices, wireless access points, and the like. Generally, the computing device 102 and the wireless device 104 are electronic and/or computing devices implemented with various components, such as a processing system and memory, as well as any number and combination of different components as further described with reference to the example device shown in FIG. 13.

In aspects of homogeneous system determination in a network, the computing device 102 can receive data messages that include the management frames 122 from the wireless device 104. Subsequent responses to the management frames and/or analysis of the management frames 122 generally refers to functions performed by the computing device 102 to identify or detect services associated with the wireless device 104. For example, the wireless device 104 may be a dual-band access point that provides wireless connectivity services on 2.4 GHz and 5.0 GHz frequency bands via 2.4 GHz and 5.0 GHz radios. The dual-band access point is referred to herein as a homogeneous system because the dual-band access point includes two different radios using a common communication protocol. The management frames 122 transmitted at 2.4 GHz include a source address (e.g., MAC address) associated with the 2.4 GHz radio of the dual-band access point, and the management frames 122 transmitted at 5.0 GHz include a different source address (e.g., another MAC address) associated with the 5.0 GHz radio of the dual-band access point.

The management frames 122 can be unicast, multicast, or broadcast packets transmitted to one or more devices from the wireless device 104. Generally, the management frames 122 can be any type of data frame that announces services or information regarding a respective one of the other devices, and/or the management frames can request information from the computing device 102. As an example, the management frames 122 are beacon frames that are broadcast to devices connected to a network or within communication range. The beacon frames include information such as a MAC address, a service set identifier (SSID), and other parameters regarding the 2.4 GHz and 5.0 GHz radios and/or the dual-band access point. The beacon frames are broadcast via the respective 2.4 GHz and 5.0 GHz radios of the dual-band access point and the computing device 102 receives the beacon frames via wireless radios 110 to identify services or information regarding the respective beacon frames.

In another example, the wireless device 104 may be an Internet of Things (IoT) device, such as a smart thermostat device that provides services for thermostat control, as well as a voice operated service (e.g., Google Assistant, Amazon Alexa, or Apple Siri). The smart thermostat device can be implemented to publish the services that indicate the capabilities of the smart thermostat by transmitting the management frames 122 using two different MAC addresses, such as one MAC address associated with the thermostat control service and another MAC address associated with the voice operated service. The two different MAC addresses enables the smart thermostat device to utilize a single wireless radio 116 to publish the services.

As shown in FIG. 1, the computing device 102 includes the one or more wireless radios 110 that receive the management frames 122 broadcast from the one or more wireless radios 116 of the wireless device 104. In this example, the computing device 102 also includes a system identification module 124 implemented to obtain the management frames 122 received by the wireless radios 110 of the computing device 102. The system identification module 124 includes a detection algorithm 126 that can be implemented to analyze the management frames 122 and detect whether each of the management frames 122 is received in separate data messages using a common communication protocol from a same radio device, or from multiple, different radio devices. The detection algorithm 126 is also implemented to determine whether the received management frames 122 were transmitted from a same device system, or from a homogeneous system that includes the same radio device or the multiple radio devices.

For example, if the wireless device 104 is implemented as a dual-band access point (e.g., a homogeneous system) as described above, then the computing device 102 can receive the management frames 122 in separate data messages transmitted from multiple wireless radios 116 of the dual-band access point. For example, one of the wireless radios 116 of the dual-band access point broadcasts the management frames 122 at 2.4 GHz and another, different one of the wireless radios 116 of the dual-band access point broadcasts the management frames 122 at 5.0 GHz. The management frames 122 of the separate data messages include different source addresses associated with each of the wireless radios 116 of the dual-band access point.

In another example, the wireless device 104 may be implemented as a smart thermostat device (e.g., a homogeneous system) with a single Wi-Fi radio (e.g., wireless radio 116 of the wireless device 104) that provides the services 118, 120 for thermostat control and a voice operated service, and the computing device 102 can then receive separate data messages associated with each service of the smart thermostat. The management frames 122 of the separate data messages include different source addresses associated with each respective service 118, 120 of the smart thermostat device. In either example described above, the detection algorithm 126 can utilize signatures of the received management frames 122 to identify or determine whether a homogeneous system transmitted the received management frames 122, as further discussed below with reference to the example wireless device shown in FIG. 2 and the example methods shown and described with reference to FIGS. 3-7.

In aspects of heterogeneous system determination in a network, the computing device 102 can receive data messages that include the management frames 122 from the one or more wireless radios 116 of the wireless device 104 using different communication protocols. Subsequent responses to the management frames and/or analysis of the management frames 122 generally refer to functions performed by the computing device 102 to identify or detect services associated with the wireless device 104. For example, the wireless device 104 may be a dual-band access point that includes Wi-Fi radios (e.g., 2.4 GHz and 5.0 GHz radios) and a Bluetooth™ radio, and each radio is associated with a different source address (i.e., MAC address). The dual-band access point in this example is referred to herein as a heterogeneous system because the dual-band access point includes multiple different radios using different communication protocols, such as the Wi-Fi radios and the Bluetooth™ radio. The computing device 102 receives the management frames 122 and each of the different source addresses of the management frames 122 is associated with one of the Wi-Fi radios or with the Bluetooth™ radio of the dual-band access point.

In another example, the wireless device 104 may be an Internet of Things (IoT) device, such as a smart home device, that includes two different radios using different communication protocols, such as a Wi-Fi radio and a Bluetooth™ radio for instance. The smart home device can be implemented to publish the services 118, 120 that indicate the capabilities of the smart home device by transmitting the management frames 122 using two different MAC addresses, such as one MAC address associated with the Wi-Fi radio and another MAC address associated with the Bluetooth™ radio. The two different MAC addresses enables the smart home device to utilize different wireless radios to publish the services using various, different radio technologies.

In implementations, the system identification module 124 determines whether the management frames 122 are communicated from a heterogeneous system. The detection algorithm 126 can be initiated by the system identification module 124 to analyze the received management frames 122 and detect whether each of the management frames 122 is received in separate data messages using different communication protocols from different radio devices. The detection algorithm 126 can then determine whether the received management frames 122 were transmitted from a same device system, or from a heterogeneous system that includes the different radio devices. For example, if the wireless device 104 is implemented as the smart home device having a Wi-Fi radio and a Bluetooth™ radio as described above, then the computing device 102 can receive the management frames 122 in separate data messages transmitted from the different radios of the smart home device, such as the Wi-Fi radio and the Bluetooth™ radio of the smart home device each broadcasting the management frames 122 using different communication protocols. The detection algorithm 126 can utilize signatures of the received management frames 122 to identify or determine whether a heterogeneous system transmitted the received management frames 122, as further discussed below with reference to the example wireless device shown in FIG. 2 and the example methods shown and described with reference to FIGS. 8-12.

Figure 2:
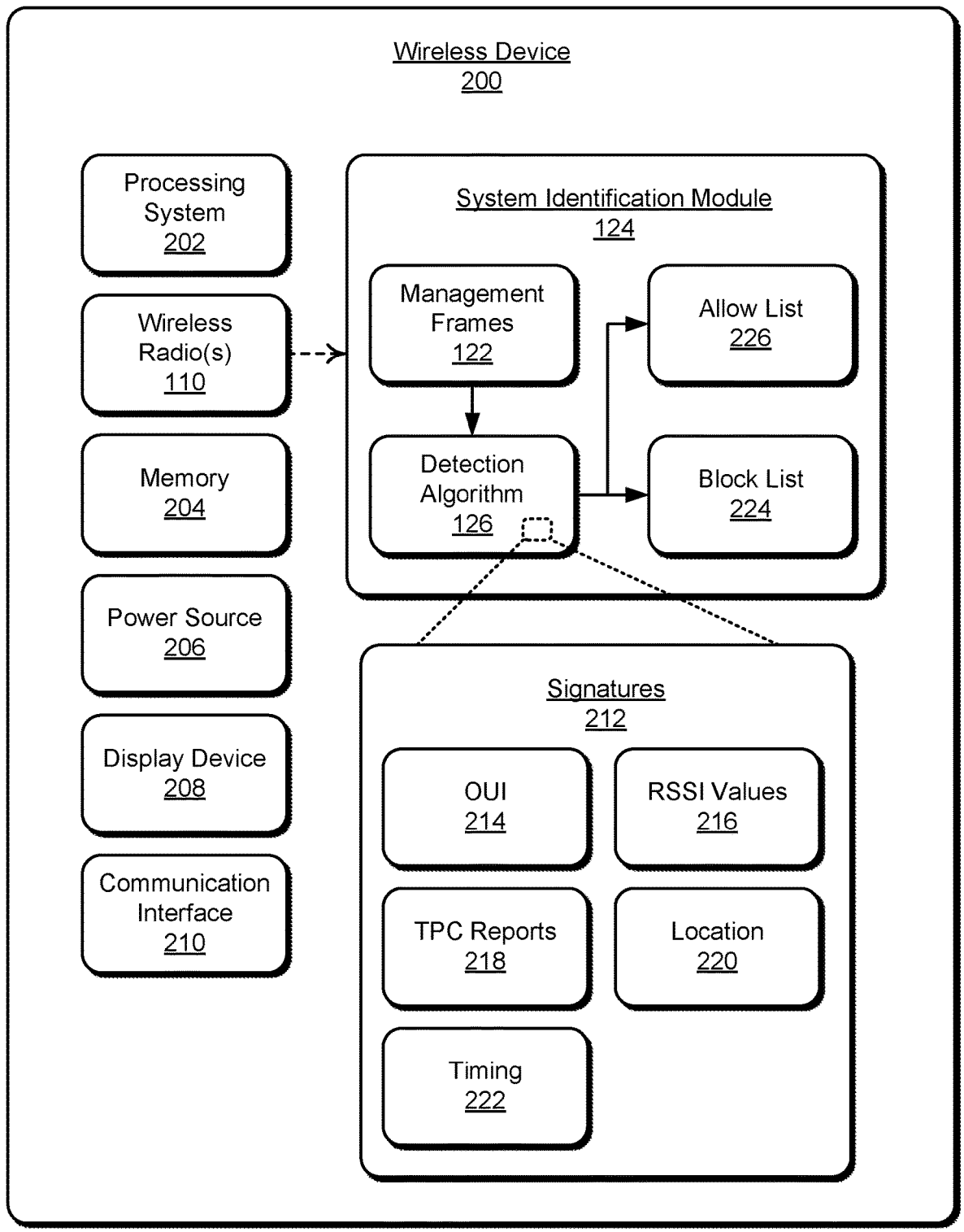
FIG. 2 illustrates an example wireless device that can be used to implement techniques for homogeneous system determination in a network, and heterogeneous system determination in a network, as described herein.

FIG. 2 illustrates an example wireless device 200 in which aspects of homogeneous system determination in a network, as well as heterogeneous system determination in a network, can be implemented. The example wireless device 200 includes any type of wireless device, such as a mobile device, a mobile phone, tablet, laptop, or any type of device that includes the one or more wireless radios 110. Generally, the wireless device 200 is any type of an electronic and/or computing device implemented with various components, such as a processing system 202 and memory 204, as well as any number and combination of different components as further described with reference to the example device shown in FIG. 13. For example, the wireless device 200 can include a power source 206 (e.g., a battery), optionally a display device 208, and a communication interface 210. In this example, the wireless device 200 may be implemented as the computing device 102 that is shown and described with reference to FIG. 1

The wireless device 200 includes the system identification module 124 that implements features of homogeneous system determination in a network, and features of heterogeneous system determination in a network, as shown and described with reference to FIG. 1. The system identification module 124 may include independent processing, memory, and logic components as a computing and/or electronic device integrated with the wireless device 200. Alternatively or in addition, the system identification module 124 can be implemented as a software application or software module, such as computer-executable software instructions that are executable with a processor (e.g., with the processing system 202) of the wireless device 200. As a software application, the system identification module 124 can be stored on computer-readable storage memory (e.g., the device memory 204), such as any suitable memory device or electronic data storage implemented with the wireless device.

As described above with reference to FIG. 1, the system identification module 124 can be implemented to detect that received management frames 122 are communicated from a radio device of a homogeneous system, or from different radio devices of a heterogeneous system in the network based in part on respective source addresses included in the management frames. The system identification module 124 can also include the detection algorithm 126, as shown and described with reference to FIG. 1. For example, the wireless device 200 receives the management frames 122 via a wireless radio 110 from a wireless device (e.g., wireless device 104), and the received management frames 122 are passed to the detection algorithm 126 of the system identification module 124. The detection algorithm 126 can then analyze the received management frames 122 and detect whether the management frames 122 are received in separate data messages from a homogeneous system, or from a heterogeneous system.

In aspects of homogeneous system determination in a network, as well as heterogeneous system determination in a network, the detection algorithm 126 includes various signatures 212 that are utilized for the determination of the received management frames 122 being communicated from a homogeneous system or from a heterogeneous system. The signatures 212 are based on data included in the received management frames 122, and can include an organizationally unique identifier (OUI) 214, received signal strength indicator (RSSI) values 216, transmit power control (TPC) reports 218, location 220, and timing 222. Any one or combination of the signatures 212 can be performed or determined by the detection algorithm 126 and can be used as a basis for the determination of the management frames 122 being communicated from a homogeneous system or from a heterogeneous system.

The OUI 214 signature is a 24-bit number that uniquely identifies a vendor or manufacturer of a device or component, and is typically the first three octets of a MAC address included in a management frame. A wireless device (e.g., wireless device 104) can support multiple MAC addresses such that each management frame transmitted by the device includes one of the multiple MAC addresses associated with a respective service of the wireless device. For example, a homogeneous system, such as a dual-band access point (2.4 GHz/5.0 GHz) has two service set identifiers (SSIDs) that are associated with the respective 2.4 GHz and 5.0 GHz frequency bands. The management frames 122 transmitted by the dual-band access point at 2.4 GHz has one MAC address, and the management frames 122 transmitted at 5.0 GHz has a different MAC address. Both MAC addresses share the same first three octets of the MAC address because a chipset that implements services of the dual-band access point is produced by a single vendor or manufacturer (and the first three octets of the MAC address being with a threshold difference). The last three octets of the MAC addresses are Network Interface Controller (NIC) specific, and typically the last three octets of the MAC addresses are different, notably the difference between the last three octets (non-OUI portion) of the two MAC addresses is at most sixteen (16) or thirty-two (32).

As an example, management frames transmitted by the 2.4 GHz radio of the dual-band access point has a MAC address of "70:3A:CB:4B:AC:EB", and management frames transmitted by the 5.0 GHz radio of the dual-band access point has a MAC address of "70:3A:CB:4B:AC:E7". In this example, both MAC addresses have the first three octets of the MAC addresses in common, which corresponds to a particular vendor and/or manufacturer associated with the first three octets of the MAC address (e.g., "70:3A:CB: . . . "). The last octet (non-OUI portion) of the MAC addresses is different by at most sixteen (16) or thirty-two (32)—"70:3A:CB:4B:AC:<u>EB</u>" vs "70:3A:CB:4B:AC:<u>E7</u>".

In aspects of homogeneous system determination in a network, the detection algorithm 126 can be implemented to determine that management frames 122 received using a common communication protocol in separate data messages from the wireless device 104 are communicated from a homogeneous system based in part on an OUI lookup of MAC addresses included in the management frames 122. In the example described above, the dual-band access point has different MAC addresses associated with the 2.4 GHz and 5.0 GHz radios, where the first three octets of the MAC addresses are the same and the last octet (non-OUI portion) of the source addresses are different by at most sixteen (16) or thirty-two (32). The detection algorithm 126 can determine that the management frames 122 are communicated from a homogeneous system (e.g. the dual-band access point) based on the first three octets of the MAC addresses corresponding to a common vendor and/or manufacturer and the last three octets of the MAC addresses being within a threshold difference.

In aspects of heterogeneous system determination in a network, the detection algorithm 126 can be implemented to determine that received management frames 122 using different communication protocols in separate data messages from the wireless device 104 are communicated from a heterogeneous system based in part on an OUI lookup of MAC addresses included in the management frames 122. For example, an IoT device includes two different radios that communicate with the wireless device 200 using different communication protocols. The two different radios can be a Wi-Fi radio and a Bluetooth™ radio, and each radio is associated with a different pre-programmed MAC address (i.e., source address). The wireless device 200 can receive a first management frame having source address that is associated with the Wi-Fi radio, and receive a second management frame having a source address that is associated with the Bluetooth™ radio. The detection algorithm 126 can determine that the management frames 122 are communicated from a heterogeneous system based on the first three octets of the MAC addresses corresponding to a common vendor and/or manufacturer and the last three octets being within a threshold difference.

In implementations, the wireless device 104 includes a single wireless radio 116 having a single MAC OUI. The wireless device 104 can be implemented to publish services (e.g., the first service 118 and second service 120) using locally administered MAC addresses. Universally administered and locally administered MAC address are distinguished by the second-least-significant bit of the first octet of the address, also referred to as the Universal/Local (U/L) bit, that identifies how the address is administered. If the U/L bit is zero, then the address is universally administered, and if the U/L bit is one, then the address is locally administered. For example, a source address of "06:00:00:00:00:00" has a binary form of "0000 0110" for the first octet of the source address. The second-least-significant bit of the first octet is set to one, thus the source address is a locally administered address. In this way, the wireless device 104 can utilize a single wireless radio 116 to generate separate MAC addresses associated with the first and second services 118, 120 provided by the wireless device 104.

In aspects of homogeneous system determination in a network, the detection algorithm 126 can be implemented to determine that received management frames 122 using a common communication protocol in separate data messages from the wireless device 104 are communicated from a homogeneous system based in part on locally administered source addresses included in the management frames 122. For example, the wireless device 104 may transmit three management frames 122 that each include three different locally administered source addresses to publish associated services for the wireless device 104 (i.e., a homogeneous system). The first octet of each of the locally administered source addresses included in the management frames 122 are different from one another, and the last three octets in the locally administered source addresses are the same. The detection algorithm 126 can compute back the locally administered source addresses to the universal administered source address. The detection algorithm 126 can then perform an OUI lookup as described above to determine that the locally administered source addresses included in the management frames 122 are communicated from the wireless device 104 and identify the wireless device 104 as a homogeneous system. Alternatively or in addition, the detection algorithm 126 can determine that the locally administered source addresses included in the management frames 122 are communicated from the homogeneous system based in part on the last three octets of the management frames being the same or within a threshold difference.

In aspects of heterogeneous system determination in a network, the detection algorithm 126 can be implemented to determine that received management frames 122 using different communication protocols in separate data messages from the wireless device 104 are communicated from a heterogeneous system based in part on locally administered source addresses included in the management frames 122. For example, the wireless device 104 may transmit two management frames 122 via two different radios (e.g., Wi-Fi and Bluetooth™ radios) that each include two different locally administered source addresses to publish associated services for the wireless device 104 (i.e., a heterogeneous system). The first octet of each of the locally administered source addresses included in the management frames 122 are different from one another, and the last three octets in the locally administered source addresses are the same. The detection algorithm 126 can compute back the locally administered source addresses to the universal administered source address. The detection algorithm 126 can then perform an OUI lookup as described above to determine that the locally administered source addresses included in the management frames 122 are communicated from the wireless device 104 having two different radios and identify the wireless device 104 as a heterogeneous system. Alternatively or in addition, the detection algorithm 126 can determine that the locally administered source addresses included in the management frames 122 are communicated from the heterogeneous system based in part on the last three octets of the management frames being the same or within a threshold difference.

In aspects of homogeneous system determination in a network, the detection algorithm 126 can be implemented to utilize the received signal strength indicator (RSSI) values 216 of the signatures 212 to determine whether received management frames 122 using a common communication protocol in separate data messages are communicated from a homogeneous system (e.g., wireless device 104). In continuation of the dual-band access point example above, beacon frames transmitted at 2.4 GHz and 5.0 GHz have a same pattern difference of RSSI values as measured by the wireless device 200. Typically, the difference of RSSI values between management frames 122 received at 2.4 GHz and 5.0 GHz is from zero to seven decibels (0-7 dB). The RSSI values 216 of the signatures 212 can indicate RSSI values of the management frames 122 received at 2.4 GHz and 5.0 GHz. The detection algorithm 126 can then determine that the received management frames 122 are communicated from a homogeneous system (e.g., the dual-band access point) based in part on a difference of the RSSI values of the management frames 122 received at 2.4 GHz and 5.0 GHz being less than a threshold value. Similarly, for intra band with multiple SSIDs in the same band, the detection algorithm 126 can associate the 2.4 GHz and the 5.0 GHz are received from the same device by evaluation of the relative swing of 2.4 GHz to 2.4 GHz, or 5.0 GHz to 5.0 GHz, which for intra band, the RSSI value swing would be relative and small. Otherwise, the detection algorithm 126 determines that the received management frames 122 are communicated from separate devices or systems.

In aspects of heterogeneous system determination in a network, the detection algorithm 126 can be implemented to utilize the RSSI values 216 of the signatures 212 to determine whether received management frames 122 using different communication protocols in separate data messages are communicated from a heterogeneous system (e.g., wireless device 104). In continuation of the IoT device example above, the Wi-Fi radio and Bluetooth™ radio each transmit management frames in respective data messages and RSSI values of the data messages can be measured by the wireless device 200. The RSSI values 216 of the signatures 212 can indicate RSSI values of the management frames 122 received from the Wi-Fi radio and Bluetooth™ radio of the IoT device. The detection algorithm 126 can then determine that the received management frames 122 are communicated from a heterogeneous system (e.g., the IoT device) based on a difference of the RSSI values of the management frames 122 received being less than a threshold value. Otherwise, the detection algorithm 126 determines that the received management frames 122 are communicated from separate devices or systems.

In aspects of homogeneous system determination in a network, the detection algorithm 126 can be implemented to utilize the transmit power control (TPC) reports 218 of the signatures 212 to determine whether received management frames 122 using a common communication protocol in separate data messages are communicated from a homogeneous system (e.g., wireless device 104). Transmit power control is a feature of 802.11h, as an amendment added to the 802.11 standard, which enables an access point to define local rules for maximum transmit power for clients and other access points. Transmit power control is a mechanism to reduce power of a radio to the minimum necessary to maintain the link with a certain quality and allows devices to avoid interference into other devices and/or to extend battery life of devices.

The TPC reports 218 of the signatures 212 can include TPC reports that indicate a transmit power and link margin associated with the received management frames 122. In implementations, the detection algorithm 126 can be implemented to request a TPC report for the management frames 122 that include different source addresses. In other implementations, the TPC reports 218 may be included with the management frames 122 and the detection algorithm 126 can parse the management frames to obtain the TPC reports. The TPC reports 218 can be utilized by the detection algorithm 126 to distinguish or determine whether a device (e.g., the dual-band access point) has a same chipset having multiple distinct radios. By comparing the TPC reports, the detection algorithm 126 can distinguish the device that has multiple distinct radios. If the TPC reports are the same or within a threshold difference, then the detection algorithm 126 determines that the received management frames 122 are communicated from a same device system or homogeneous system having multiple distinct radios using a common communication protocol (e.g., the dual-band access point). Otherwise, the detection algorithm 126 can determine that the received management frames 122 are communicated from separate devices or systems.

In aspects of homogeneous system determination in a network, the detection algorithm 126 can be implemented to utilize the location 220 feature of the signatures 212 to determine whether received management frames 122 using a common communication protocol in separate data messages are communicated from a homogeneous system (e.g., wireless device 104). For example, the wireless device 104 may be a Wi-Fi location enabled device that generates a geospatial location as location data, and the wireless device 200 can request the location data for the management frames 122 with different source addresses. In other examples, the wireless device 104 can include various other radio technologies for determining or generating the geospatial location, such as Bluetooth™ Low Energy (BLE), GPS, RFID, NFC, Wi-Fi Direct, and the like. Generally, the location data indicates a geospatial location of the wireless device 104. In continuation of the example Wi-Fi location enabled device, the request for the location data can be a request for a location civic report and/or location civic information according to the Wi-Fi location protocol. The location civic report can indicate a civic address of the wireless device 104 and the location civic information can indicate latitude, longitude, altitude, and station floor/height information of the wireless device 104.

The location 220 feature of the signatures 212 can include requested location civic reports and/or location civic information associated with the received management frames 122. The detection algorithm 126 can request location data for the management frames 122 with different source addresses, and the location 220 can be utilized by the detection algorithm 126 to determine a geospatial location of devices that transmitted the management frames 122. By comparing the location data for management frames 122 with different source addresses, the detection algorithm 126 can determine whether the locations 220 associated with the different sources addresses of the management frames 122 are at a same location or within a threshold distance from one another. If the location is the same or within the threshold distance from one another, then the detection algorithm 126 determines that the received management frames 122 are communicated from the same homogeneous system (e.g., wireless device 104). Otherwise, the detection algorithm 126 determines that the received management frames 122 are communicated from separate devices or systems.

In aspects of heterogeneous system determination in a network, the detection algorithm 126 can be implemented to utilize the location 220 feature of the signatures 212 to determine whether received management frames 122 using different communication protocols are communicated from a heterogeneous system (e.g., wireless device 104). For example, the wireless device 104 may be a Wi-Fi location enabled and Bluetooth™ location enabled device, and the wireless device 102 can receive location data included with the management frames 122 or request the location data for the management frames that have different source addresses. The location data indicates a location of the wireless device 104 having the Wi-Fi and Bluetooth™ radio and can be stored as the location 220 of the signatures 212.

The detection algorithm 126 can utilize the location 220 feature to determine a location of the devices that transmitted the management frames 122. By comparing the location data for the management frames 122 received via Wi-Fi and Bluetooth™ protocols, the detection algorithm 126 can determine whether the locations 220 associated with the different source addresses of the received management frames 122 are at a same location or within a threshold distance from one another. If the location is the same or within the threshold distance from one another, then the detection algorithm 126 determines that the received management frames 122 are communicated from a same device system or heterogeneous system (e.g., wireless device 104 having Wi-Fi and Bluetooth™ radios). Otherwise, the detection algorithm 126 determines that the received management frames 122 are communicated from separate devices or systems.

In aspects of homogeneous system determination in a network, the detection algorithm 126 can be implemented to utilize the timing 222 feature of the signatures 212 to determine whether received management frames 122 using a common communication protocol in separate data messages are communicated from a homogeneous system (e.g., wireless device 104). For example, a fine timing measurement protocol is a feature of 802.11mc to enable distance measurements between Wi-Fi devices by measuring a duration of time that a frame is required to travel through the air between the Wi-Fi devices. In other examples, other types of timing measurements, such as time of flight (ToF), Time of Arrival (ToA), Time Difference of Arrival (TDoA), Time Difference of Flight (TDoF), and the like, can be utilized to enable distance measurements between devices.

The timing 222 feature of the signatures 212 can include distance measurements associated with the received management frames 122. The timing 222 can be utilized by the detection algorithm 126 to determine distances to devices that transmitted the management frames 122. By comparing the distances to radios that transmitted the management frames 122, the detection algorithm 126 can determine whether timing 222 associated with the different source addresses of the management frames 122 are a same distance or within a threshold distance from the wireless device 200. If the distances are the same or within a threshold distance, then the detection algorithm 126 determines that the received management frames 122 are communicated from a same device system or homogeneous system. Otherwise, the detection algorithm 126 determines that the received management frames 122 are communicated from separate devices or systems.

In aspects of homogeneous system determination in a network, and heterogeneous system determination in a network, the detection algorithm 126 can be implemented to utilize any one or combination of the various signatures 212 to determine that the received management frames 122 are communicated from a same device system. Depending on the communication protocol used to communicate the management frames, the detection algorithm 126 can identify a device system as a homogeneous system or a heterogeneous system using the techniques described herein. Additionally, the detection algorithm 126 can determine whether a homogeneous system includes multiple wireless radios with multiple source addresses (e.g., MAC addresses), or determine whether the homogeneous system includes a single wireless radio that rotates MAC addresses to transmit the management frames. For example, a homogeneous system (e.g., wireless device 104) that includes multiple wireless radios 116, such as a dual-band access point having 2.4 GHz and 5.0 GHz radios, can transmit the management frames using the 2.4 GHz and 5.0 GHz radios that have a common communication protocol. Alternatively, the homogeneous system can include a single wireless radio 116 that locally administers multiple different source addresses as described above.

When the detection algorithm 126 has determined that the received management frames 122 are communicated from a homogeneous system or from a heterogeneous system, the system identification module 124 can then determine whether to associate with the homogeneous system or the heterogeneous system based on an operational state of services associated with the management frames. For example, if a backend server for either of the services 118, 120 associated with the received management frames 122 of the wireless device 104 is not responding or not working, the system identification module 124 can set an indication of the operational state of the services associated with the management frames as not operational. In another example, if a network connection to the backend server for either of the services associated with the received management frames 122 of the wireless device 104 is down or otherwise off-line, the system identification module 124 can set an indication of the operational state of services associated with the management frames as not operational.

The system identification module 124 can detect issues associated with the wireless device 104, and add the wireless device 104 to a block list 224. The management frames 122 received from the wireless device 104, as well as subsequent management frames, will be ignored by not responding to the management frames if the wireless device 104 has been added to the block list 224. Additionally, the system identification module 124 may detect that the backend issues associated with the wireless device 104 have been resolved, and can initiate to remove the wireless device 104 from the block list 224 and add the wireless device 104 to an allow list 226. In another example, the system identification module 124 may not detect any issues associated with the services of the wireless device 104, and the system identification module 124 can initiate to add the wireless device 104 to the allow list 226. Alternatively or in addition, a user of the wireless device 200 can provide an input that adds user selected homogeneous systems or heterogeneous systems to the block list 224 or the allow list 226.

Example methods 300, 400, 500, 600, and 700 are described with reference to FIGS. 3-7 in accordance with implementations of homogeneous system determination in a network. Similarly, example methods 800, 900, 1000, 1100, and 1200 are described with reference to FIGS. 8-12 in accordance with implementations of heterogeneous system determination in a network. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
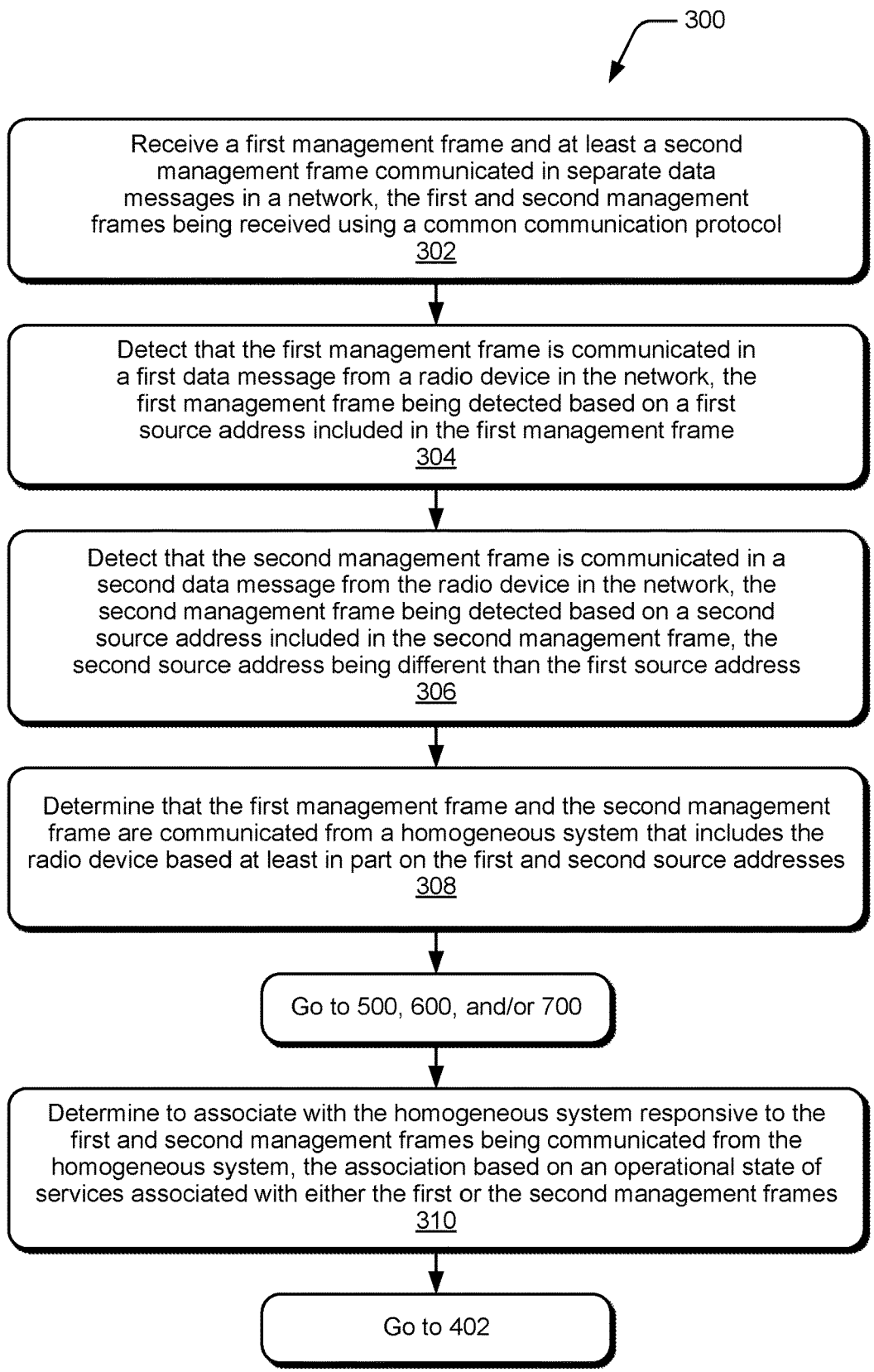
FIGS. 3-7 illustrate example methods of homogeneous system determination in a network in accordance with one or more implementations of the techniques described herein.

FIG. 3 illustrates example method(s) 300 of homogeneous system determination in a network. The order in which the method is described is not intended to be construed as a limitation, and any number or combination of the described method operations can be performed in any order to perform a method, or an alternate method.

At 302, a first management frame and at least a second management frame that are communicated in separate data messages in a network are received, where the first and second management frames are received using a common communication protocol. For example, the wireless radio 116 of the wireless device 104 shown in FIG. 1 is a Wi-Fi radio that communicates with other Wi-Fi devices using the 802.11 protocol. The wireless device 104 transmits via the Wi-Fi radio 116 first and second management frames 122 using a common communication protocol in separate data messages that are associated with the respective first service 118 and the second service 120. The first and second management frames 122 are then received by a Wi-Fi radio (e.g., wireless radio 110) of the wireless device 200.

At 304, the first management frame is detected as being communicated in a first data message from a radio device in the network based on a first source address included in the first management frame. For example, the system identification module 124 initiates the detection algorithm 126 to parse the first data message to identify a first source address included in the first management frame. At 306, the second management frame is detected as being communicated in a second data message from the radio device in the network based on a second source address included in the second management frame, where the second source address is different than the first source address. For example, the system identification module 124 initiates the detection algorithm 126 to parse the second data message to identify a second source address included in the second management frame.

At 308, the first management frame and the second management frame are determined as being communicated from a homogeneous system that includes the radio device based at least in part on the first and second source addresses. For example, the detection algorithm 126 determines that the first management frame and the second management frame are communicated from the Wi-Fi radio 116 of the wireless device 104 based on any one or combination of the various signatures 212 of the management frames 122, as shown and described with reference to FIG. 2. If the first and second management frames are determined as being communicated from the wireless device 104, then the detection algorithm 126 identifies or classifies the wireless device 104 as a homogeneous system. This determination based on the signatures 212 is further described with reference to the example methods 500, 600, and 700 shown in FIGS. 5-7.

At 310, an association with the homogenous system is determined responsive to the first and second management frames being communicated from the homogeneous system, the association with the homogeneous system based on an operational state of services associated with either the first or the second management frames. For example, responsive to the determination that the first and second management frames are communicated from the wireless device 104, and the detection algorithm 126 identifies the wireless device 104 as a homogeneous system, the detection algorithm 126 determines whether to associate with the wireless device 104 based on an operational state of the first service 118 and/or the second service 120. The method then continues to 402 as further described with reference to the example method shown in FIG. 4.

Figure 4:
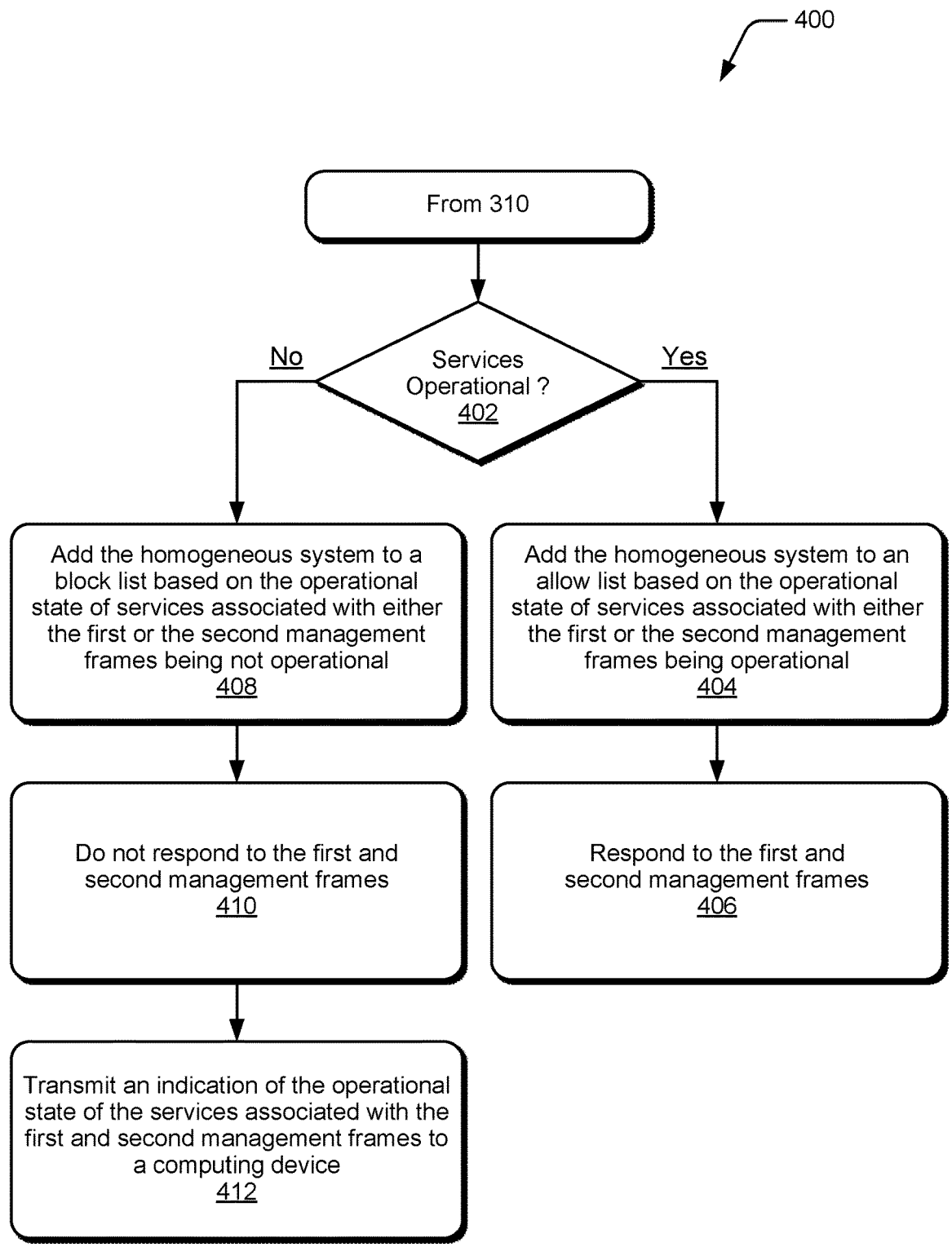

FIG. 4 illustrates example method(s) 400 of homogeneous system determination in a network. The order in which the method is described is not intended to be construed as a limitation, and any number or combination of the described method operations can be performed in any order to perform a method, or an alternate method.

At 402, a determination is made as to whether services associated with the management frames received from a homogeneous system are operational. For example, the detection algorithm 126 responds to the received management frames 122 to determine an operational state of the first service 118 and/or the second service 120. In one example, the detection algorithm 126 detects that a backend server for either one of the services is not responding or not operable, and can then infer that the other service is not operational as well due to a backend issue. In another example, the detection algorithm 126 can detect that the network availability or a network connection (e.g., an Internet connection) for the homogeneous system is down or otherwise off-line, and determines that the services are not operational. In another example, the detection algorithm 126 can request an indication of the operational state of the first service 118 and/or the second service 120 to determine whether the services are operational.

If the services associated with the management frames received from a homogeneous system are operational (i.e., "Yes" from 402), then the method 400 continues at 404 to add the homogeneous system to an allow list based on the services associated with either the first or the second management frames being operational. For example, the detection algorithm 126 detects that a backend server for either the first service 118 or the second service 120 is operational and adds the wireless device 104 to the allow list 226. The detection algorithm 126 can infer that if the backend server for one of the services of the wireless device 104 is operational, then the other service is operational as well.

At 406, the first and second management frames are responded to based on the homogeneous system being added to the allow list. For example, the system identification module 124 responds to the first and second management frames 122 based on the wireless device 104 having been added to the allow list 226. Alternatively, firmware of the wireless radio 110 or other executable code stored in the wireless device 200 can be implemented to handle communications between the wireless device 200 and the homogeneous system (e.g., the wireless device 104) based on systems listed in the allow list 226.

If the services associated with the management frames received from a homogeneous system is not operational (i.e., "No" from 402), then the method 400 continues at 408 to add the homogeneous system to a block list based on the operational state of services associated with either the first or the second management frames being not operational. For example, the detection algorithm 126 detects that a backend server for either the first service 118 or the second service 120 is unavailable and adds the wireless device 104 to the block list 224. The detection algorithm 126 can infer that if the backend server for one of the services of the wireless device 104 is not operational, then the other service is also not operational.

At 410, the management frames are ignored by not responding to the first and second management frames based on the homogeneous system being added to the block list. For example, the system identification module 124 does not initiate to respond to the first and second management frames 122 based on the wireless device 104 having been added to the block list 224. In this way, the wireless device 200 can determine that the services associated with the wireless device 104 are not available due to a communication issue or an issue with the backend server, and not respond to the received management frames 122, which saves battery power of the device.

At 412, an indication of the operational state of the services associated with the first and second management frames is transmitted to a computing device. For example, the system identification module 124 transmits via a Wi-Fi radio (e.g., wireless radio 110) an indication that the services associated with the first and second management frames of the homogeneous system (e.g., wireless device 104) are not operational to a computing device communicatively accessible over the network 106. Alternatively, the system identification module 124 transmits the indication of the operational state of the services associated with the homogeneous system via any suitable communications method, such as via Bluetooth™, NFC, RFID, and the like.

Figure 5:
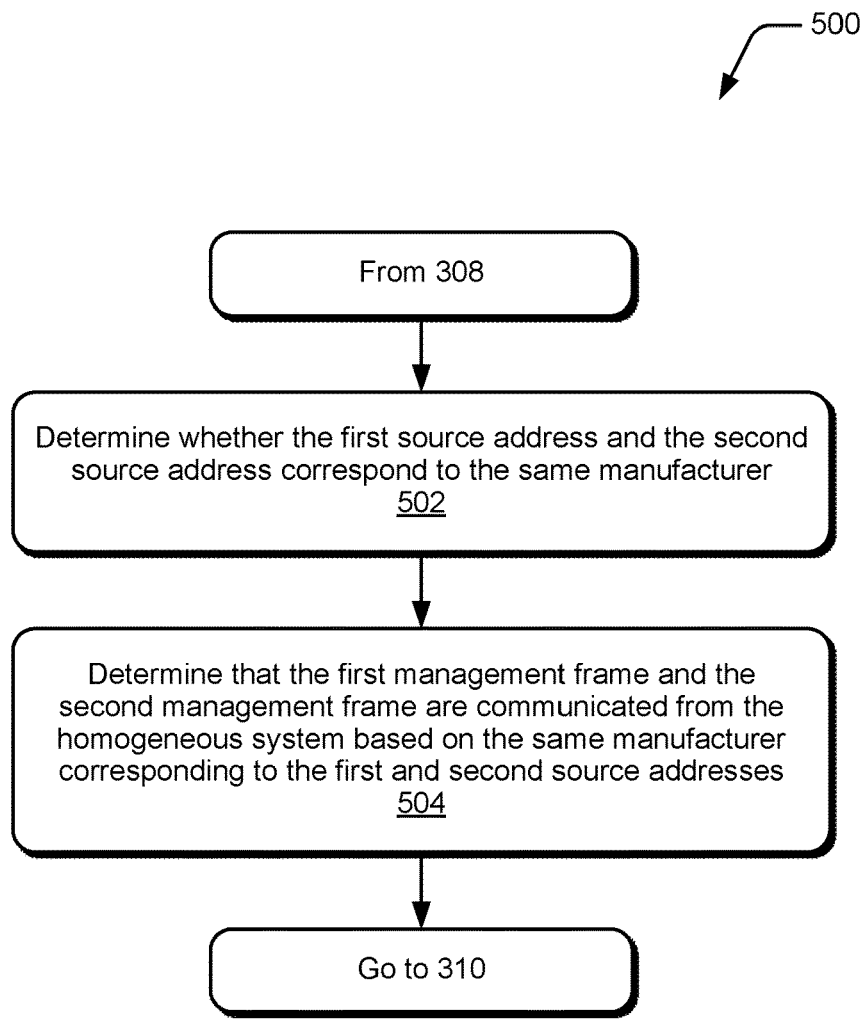

FIG. 5 illustrates example method(s) 500 of homogeneous system determination in a network. The order in which the method is described is not intended to be construed as a limitation, and any number or combination of the described method operations can be performed in any order to perform a method, or an alternate method.

At 502, a determination as to whether the first source address and the second source address correspond to the same manufacturer. For example, the detection algorithm 126 utilizes the OUI 214 of the signatures 212 to perform an OUI lookup of the received management frames 122. An OUI lookup is performed on the first and second source addresses, and the result from the OUI lookup indicates the manufacturers associated with the first and second source addresses. The detection algorithm 126 can then compare the manufacturers from the result of the OUI lookup and determine whether the first and second source addresses correspond to the same manufacturer.

In another example, the detection algorithm 126 may detect that the first and second source addresses are locally administered addresses. The detection algorithm 126 can compute back the locally administered source addresses to the universal administered source addresses. The detection algorithm 126 can then perform the OUI lookup as described above to determine that the locally administered source addresses included in the management frames 122 are communicated from a single wireless radio 116 of the wireless device 104 (e.g., a homogeneous system). Notably, a device which supports multiple MAC will have the same OUI (e.g., a non-OUI), and primarily, the last octet will differ by the order of two. For example, an access point which is DBDC (Dual Band Dual Cell) will have two SSID (i.e., the same or different) each on the 2.4 GHz band and the 5.0 GHz band, respectively.

At 504, the first management frame and the second management frame are determined to have been communicated from the homogeneous system based on the same manufacturer corresponding to the first and second source addresses. For example, the detection algorithm 126 determines that the first and second management frames 122 are communicated from a homogeneous system (e.g., wireless device 104) based on the OUI lookup indicating that the first and second source addresses correspond to the same manufacturer. The method then continues at 310.

Figure 6:
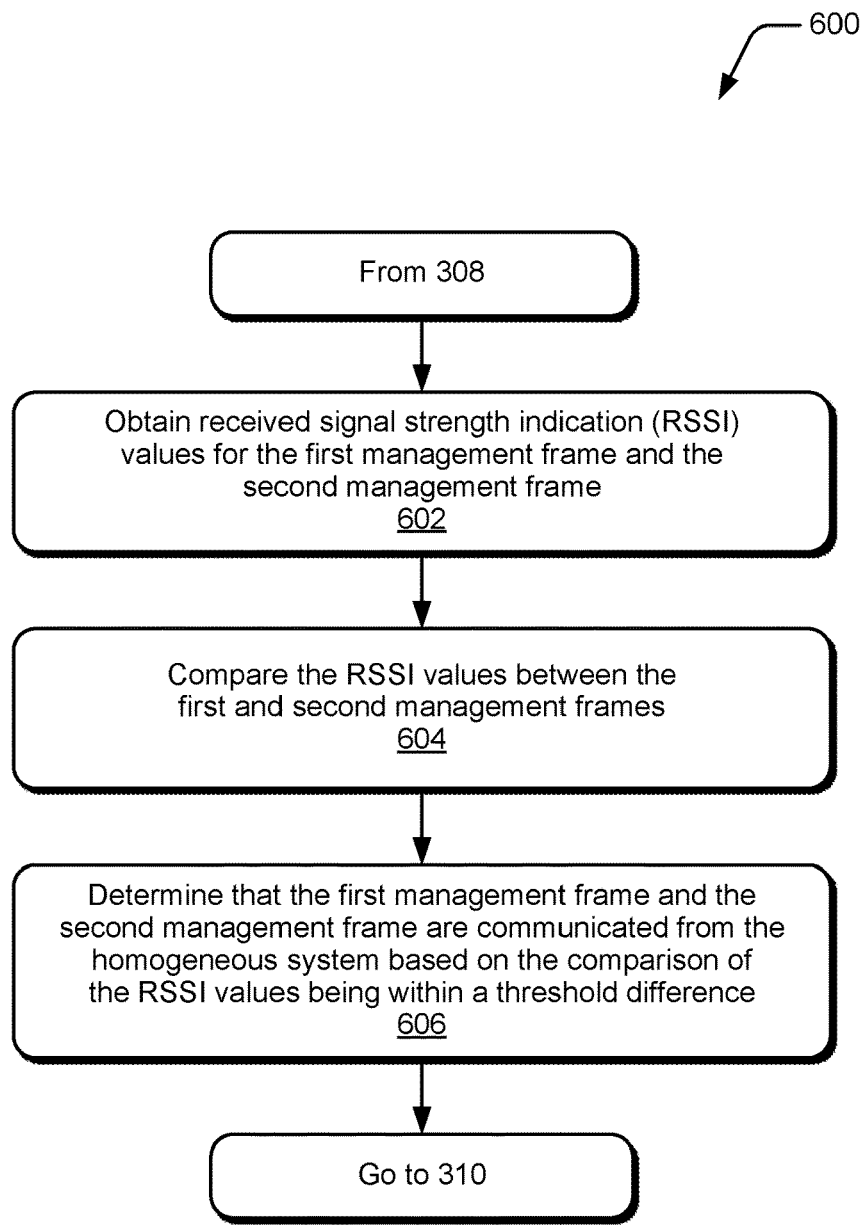

FIG. 6 illustrates example method(s) 600 of homogeneous system determination in a network. The order in which the method is described is not intended to be construed as a limitation, and any number or combination of the described method operations can be performed in any order to perform a method, or an alternate method.

At 602, a received signal strength indictor (RSSI) value is obtained for the first management frame and the second management frame. For example, the detection algorithm 126 utilizes the RSSI values 216 of the signatures 212 to obtain RSSI values of the received management frames 122. At 604, the RSSI values between the first and second management frames are compared. For example, the detection algorithm 126 compares the RSSI value 216 between the first and second management frames.

At 606, the first management frame and the second management frame are determined to have been communicated from the homogeneous system based on the comparison of the RSSI values being within a threshold difference. For example, the detection algorithm 126 determines that the first and second management frames 122 are communicated from a homogeneous system (e.g., wireless device 104) based on the comparison of the RSSI values being within a threshold difference. The method then continues at 310.

Figure 7:
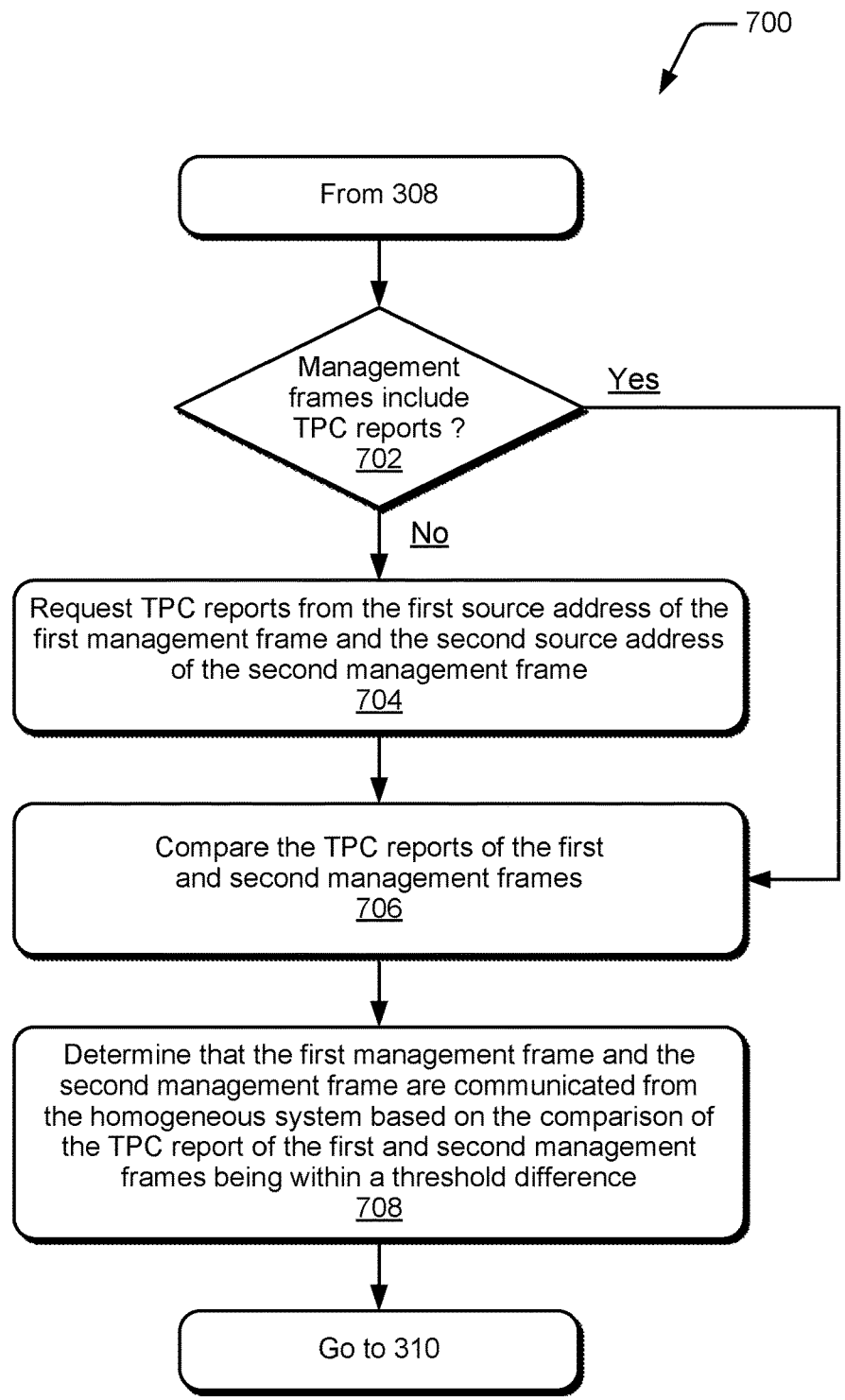

FIG. 7 illustrates example method(s) 700 of homogeneous system determination in a network. The order in which the method is described is not intended to be construed as a limitation, and any number or combination of the described method operations can be performed in any order to perform a method, or an alternate method.

At 702, a determination is made as to whether the first and second management frames include TPC reports. For example, the detection algorithm 126 parses the first and second management frames 122 to determine whether TPC reports 218 are included in the management frames. If the TPC reports 218 are included in the management frames 122 (i.e., "Yes" from 702), then the TPC reports are stored and the method continues at 706. For example, after the first and second management frames 122 are parsed and the TPC reports 218 are determined as being included in the first and second management frames 122, the detection algorithm 126 stores the TPC reports of the first and second management frames in TPC reports 218 of the signatures 212.

If the TPC reports are not included with the management frames 122 (i.e., "No" from 702), then at 704, the TPC reports are requested from the first source address of the first management frame and from the second address of the second management frame. For example, the detection algorithm 126 determines that the TPC reports 218 are not included in the first and second management frames 122 and transmits requests to the first source address of the first management frame and the second source address of the second management frame to obtain the TPC reports.

At 706, the TPC reports of the first and second management frames are compared. For example, the detection algorithm 126 compares the TPC reports 218 of the first and second management frames. At 708, the first management frame and the second management frame are determined to have been communicated from the homogeneous system based on the comparison of the TPC report of the first and second management frames being within a threshold difference. For example, the detection algorithm 126 determines that the first and second management frames 122 are communicated from a homogeneous system (e.g., wireless device 104) based on the comparison of the TPC report being within a threshold difference. The method then continues at 310.

Figure 8:
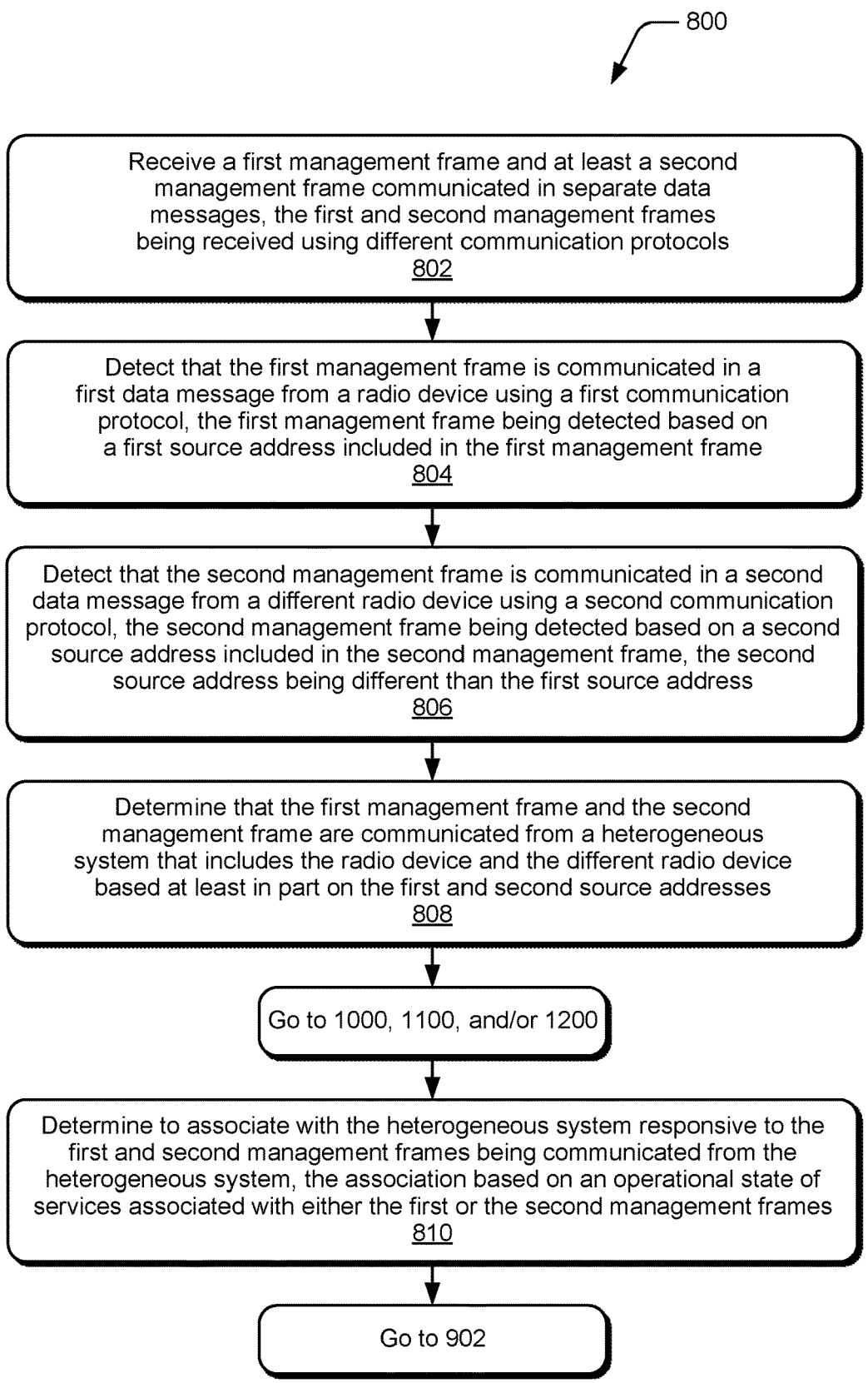
FIGS. 8-12 illustrate example methods of heterogeneous system determination in a network in accordance with one or more implementations of the techniques described herein.

FIG. 8 illustrates example method(s) 800 of heterogeneous system determination in a network. The order in which the method is described is not intended to be construed as a limitation, and any number or combination of the described method operations can be performed in any order to perform a method, or an alternate method.

At 802, a first management frame and at least a second management frame that are communicated in separate data messages are received. For example, the wireless device 104 is an IoT device having a Wi-Fi radio and a Bluetooth™ radio (e.g., wireless radios 116). The IoT device transmits via the Wi-Fi radio 116 a first management frame 122 and transmits via the Bluetooth™ radio a second management frame 122 in separate data messages. The data messages including the first and second management frames 122 are then received by the respective wireless radios 110 of the wireless device 200 (e.g., the wireless radios 110).

At 804, the first management frame is detected as being communicated in a first data message from a radio device using a first communication protocol based on a first source address included in the first management frame. For example, the system identification module 124 initiates the detection algorithm 126 to parse the first data message according to the first communication protocol to identify a first source address included in the first management frame. At 806, the second management frame is detected as being communicated in a second data message from a different radio device using a second communication protocol based on a second source address included in the second management frame, where the second source address is different than the first source address. For example, the system identification module 124 initiates the detection algorithm 126 to parse the second data message according to the second communication protocol to identify a second source address included in the second management frame.

At 808, the first management frame and the second management frame are determined as being communicated from a heterogeneous system that includes the radio device and the different radio device in a network based at least in part on the first and second source addresses. For example, the detection algorithm 126 determines that the first management frame and the second management frame are communicated from the Wi-Fi radio 116 and the Bluetooth™ radio 116 of the wireless device 104. If the first and second management frames 122 are determined as being communicated from the wireless device 104, then the detection algorithm 126 identifies or classifies the wireless device 104 as a heterogeneous system. This determination based on the signatures 212 is further described with reference to the example methods 1000, 1100, and 1200 shown in FIGS. 10-12.

At 810, an association with the heterogeneous system is determined responsive to the first and second management frames being communicated from the heterogeneous system, the association with the heterogeneous system based on an operational state of services associated with either the first or the second management frames. For example, responsive to the determination that the first and second management frames are communicated from the wireless device 104, and the detection algorithm 126 identifies the wireless device 104 as a heterogeneous system, the detection algorithm 126 determines whether to associate with the wireless device 104 based on the operational state of the first service 118 and/or the second service 120. The method then continues to 902 as further described with reference to the example method shown in FIG. 9.

Figure 9:
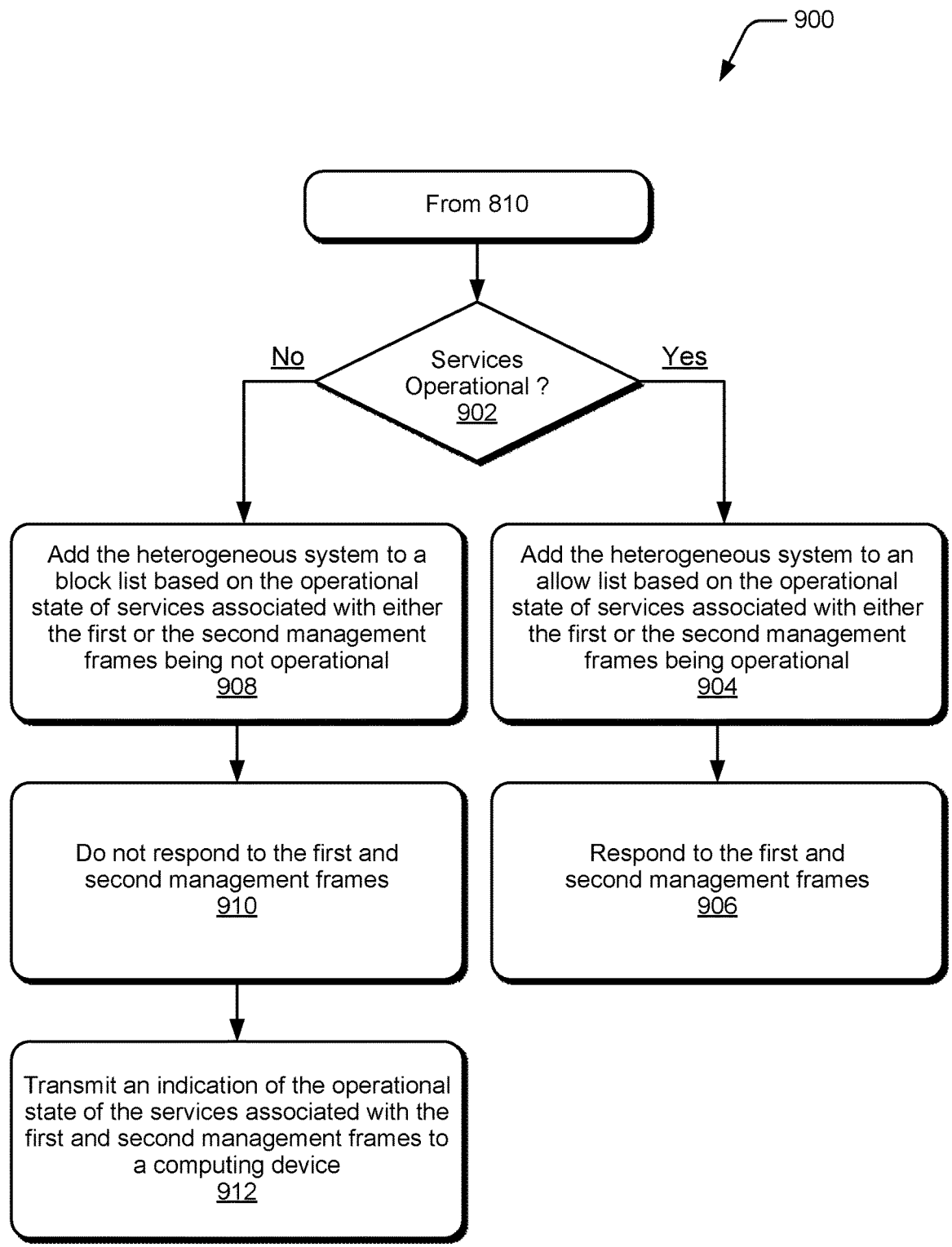

FIG. 9 illustrates example method(s) 900 of heterogeneous system determination in a network. The order in which the method is described is not intended to be construed as a limitation, and any number or combination of the described method operations can be performed in any order to perform a method, or an alternate method.

At 902, a determination is made as to whether services associated with the management frames received from a heterogeneous system are operational. For example, the detection algorithm 126 responds to the received management frames 122 to determine an operational state of the first service 118 and/or the second service 120. In one example, the detection algorithm 126 detects that a backend server for either one of the services is not responding or not operable, and can then infer that the other service is not operational as well due to a backend issue. In another example, the detection algorithm 126 can detect that the network availability or a network connection (e.g., an Internet connection) for the heterogeneous system is down or otherwise off-line, and determines that the services are not operational. In another example, the detection algorithm 126 can request an indication of the operational state of the first service 118 and/or the second service 120 to determine whether the services are operational.

If the services associated with the management frames received from a heterogeneous system are operational (i.e., "Yes" from 902), then the method 900 continues at 904 to add the heterogeneous system to an allow list based on the services associated with either the first or the second management frames being operational. For example, the detection algorithm 126 detects that a backend server for either the first service 118 or the second service 120 is operational and adds the wireless device 104 to the allow list 226. The detection algorithm 126 can infer that if the backend server for one of the services of the wireless device 104 is operational, then the other service is operational as well.

At 906, the first and second management frames are responded to based on the heterogeneous system being added to the allow list. For example, the system identification module 124 responds to the first and second management frames 122 based on the wireless device 104 having been added to the allow list 226. Alternatively, firmware of the wireless radio 110 or other executable code stored in the wireless device 200 can be implemented to handle communications between the wireless device 200 and the heterogeneous system (e.g., the wireless device 104) based on systems listed in the allow list 226.

If the services associated with the management frames received from a heterogeneous system is not operational (i.e., "No" from 902), then the method 900 continues at 908 to add the heterogeneous system to a block list based on the operational state of services associated with either the first or the second management frames being unavailable. For example, the detection algorithm 126 detects that a backend server for either the first service 118 or the second service 120 is unavailable and adds the wireless device 104 to the block list 224. The detection algorithm 126 can infer that if the backend server for one of the services of the wireless device 104 is not operational, then the other service is also not operational.

At 910, the management frames are ignored by not responding to the first and second management frames based on the heterogeneous system being added to the block list. For example, the system identification module 124 does not initiate to respond to the first and second management frames 122 based on the wireless device 104 having been added to the block list 224. In this way, the wireless device 200 can determine that the services associated with the wireless device 104 are not available due to a communication issue or an issue with the backend server, and not respond to the received management frames 122, which saves battery power of the device.

At 912, an indication of the operational state of the services associated with the first and second management frames is transmitted to a computing device. For example, the system identification module 124 transmits via a Wi-Fi radio (e.g., wireless radio 110) an indication that the services associated with the first and second management frames of the heterogeneous system (e.g., wireless device 104) are not operational to a computing device communicatively accessible over the network 106. Alternatively, the system identification module 124 transmits the indication of the operational state of the services associated with the heterogeneous system via any suitable communications method, such as via Bluetooth™, NFC, RFID, and the like.

Figure 10:
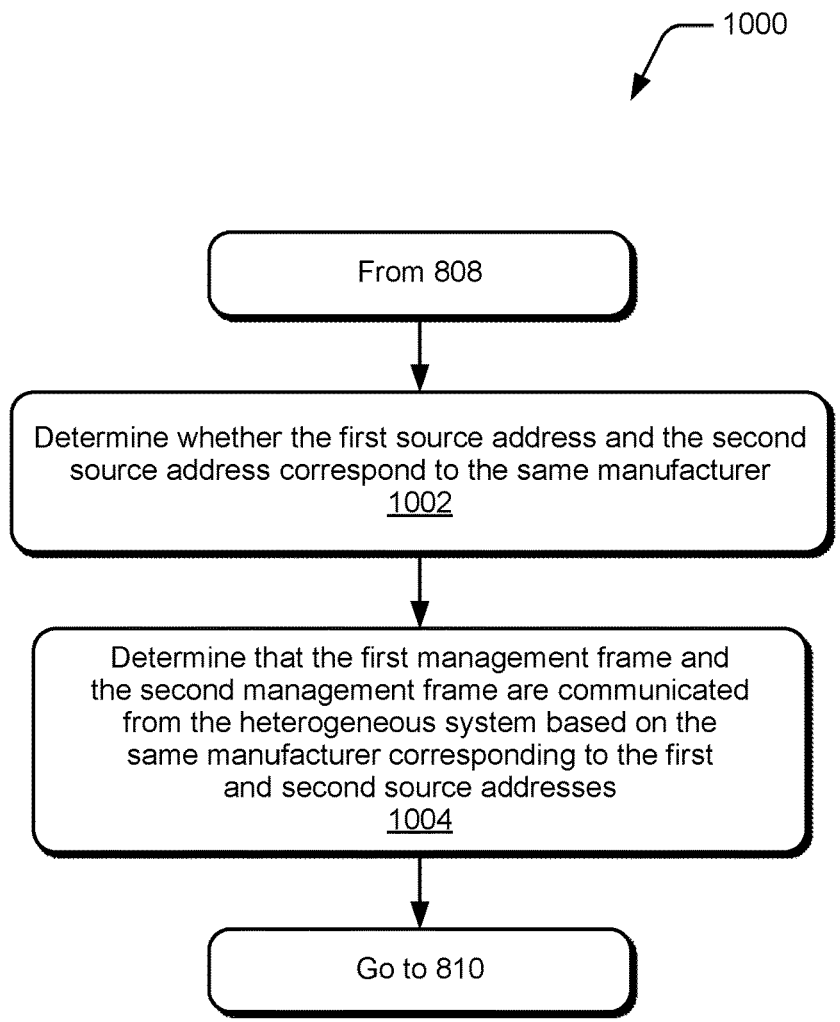

FIG. 10 illustrates example method(s) 1000 of heterogeneous system determination in a network. The order in which the method is described is not intended to be construed as a limitation, and any number or combination of the described method operations can be performed in any order to perform a method, or an alternate method.

At 1002, a determination as to whether the first source address and the second source address correspond to the same manufacturer. For example, the detection algorithm 126 utilizes the OUI 214 of the signatures 212 to perform an OUI lookup of the received management frames 122. An OUI lookup is performed on the first and second source addresses, and the result from the OUI lookup indicates the manufacturers associated with the first and second source addresses. The detection algorithm 126 can then compare the manufacturers from the result of the OUI lookup and determine whether the first and second source addresses correspond to the same manufacturer.

In another example, the detection algorithm 126 may detect that the first and second source addresses are locally administered addresses. The detection algorithm 126 can compute back the locally administered source addresses to the universal administered source address. The detection algorithm 126 can then perform the OUI lookup as described above to determine that the locally administered source addresses included in the management frames 122 are communicated from the wireless device 104 (e.g., heterogeneous system). Notably, a device which supports multiple MAC will have the same OUI (e.g., a non-OUI), and primarily, the last octet will differ by the order of two. For example, an access point which is DBDC will have two SSID (i.e., the same or different) each on the 2.4 GHz band and the 5.0 GHz band, respectively.

At 1004, the first management frame and the second management frame are determined to have been communicated from the heterogeneous system based on the same manufacturer corresponding to the first and second source addresses. For example, the detection algorithm 126 determines that the first and second management frames 122 are communicated from a heterogeneous system (e.g., wireless device 104) based on the OUI lookup indicating that the first and second source addresses correspond to the same manufacturer. The method then continues at 810.

Figure 11:
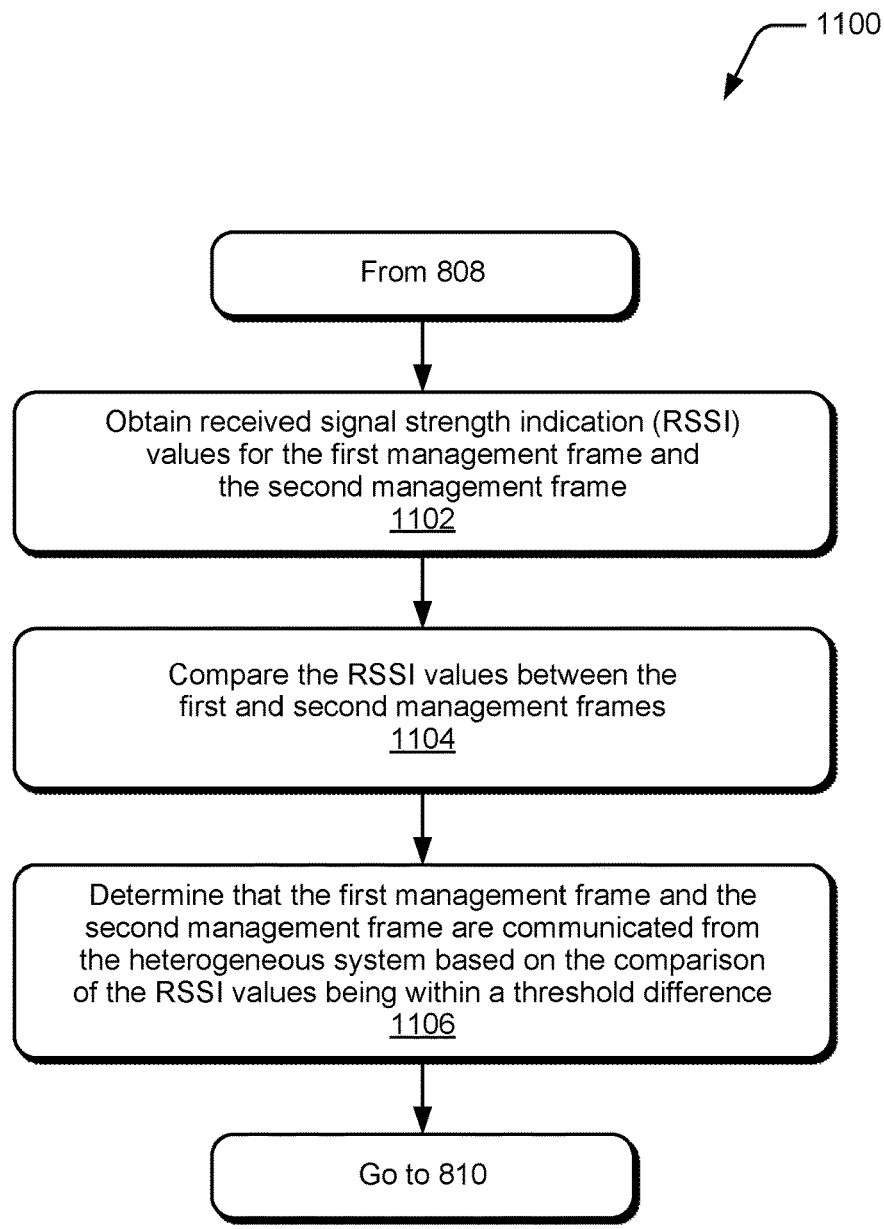

FIG. 11 illustrates example method(s) 1100 of heterogeneous system determination in a network. The order in which the method is described is not intended to be construed as a limitation, and any number or combination of the described method operations can be performed in any order to perform a method, or an alternate method.

At 1102, a received signal strength indictor (RSSI) values are obtained for the first management frame and the second management frame. For example, the detection algorithm 126 utilizes the RSSI values 216 of the signatures 212 to obtain RSSI values of the received management frames 122. At 1104, the RSSI values between the first and second management frames are compared. For example, the detection algorithm 126 compares the RSSI value 216 between the first and second management frames.

At 1106, the first management frame and the second management frame are determined to have been communicated from a heterogeneous system based on the comparison of the RSSI values being within a threshold difference. For example, the detection algorithm 126 determines that the first and second management frames 122 are communicated from a heterogeneous system (e.g., wireless device 104) based on the comparison of the RSSI values being within a threshold difference. The method then continues at 810.

Figure 12:
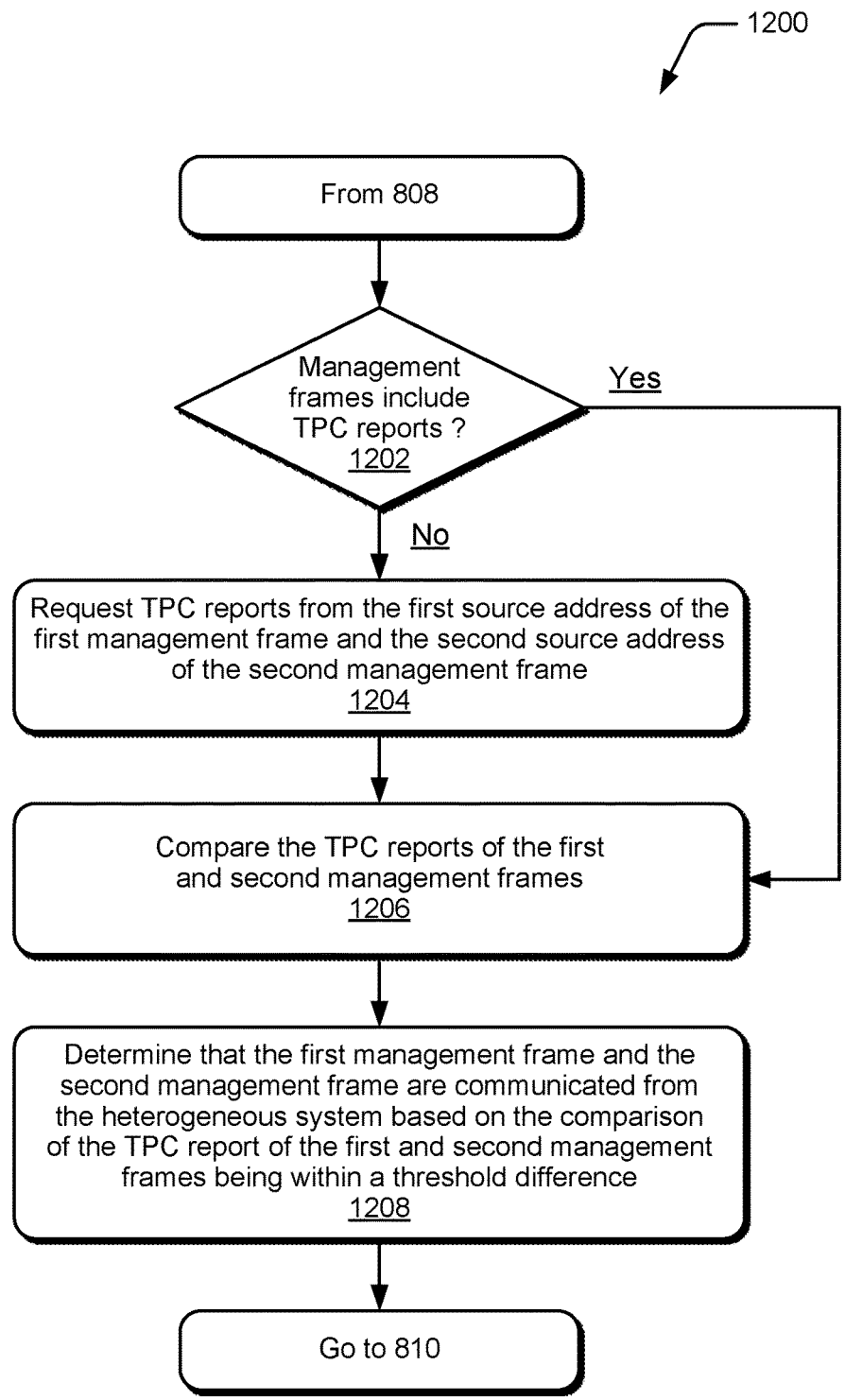

FIG. 12 illustrates example method(s) 1200 of heterogeneous system determination in a network. The order in which the method is described is not intended to be construed as a limitation, and any number or combination of the described method operations can be performed in any order to perform a method, or an alternate method.

At 1202, a determination is made as to whether the first and second management frames include TPC reports. For example, the detection algorithm 126 parses the first and second management frames 122 to determine whether TPC reports 218 are included in the management frames. If the TPC reports 218 are included in the management frames 122 (i.e., "Yes" from 1202), then the TPC reports are stored and the method continues at 1206. For example, after the first and second management frames 122 are parsed and the TPC reports 218 are determined as being included in the first and second management frames 122, the detection algorithm 126 stores the TPC reports of the first and second management frames in TPC reports 218 of the signatures 212.

If the TPC reports are not included with the management frames 122 (i.e., "No" from 1202), then at 1204, the TPC reports are requested from the first source address of the first management frame and the second address of the second management frame. For example, the detection algorithm 126 determines that the TPC reports 218 are not included in the first and second management frames 122 and transmits requests to the first source address of the first management frame and the second source address of the second management frame to obtain the TPC reports.

At 1206, the TPC reports of the first and second management frames are compared. For example, the detection algorithm 126 compares the TPC reports 218 of the first and second management frames. At 1208, the first management frame and the second management frame are determined to have been communicated from the heterogeneous system based on the comparison of the TPC report of the first and second management frames being within a threshold difference. For example, the detection algorithm 126 determines that the first and second management frames 122 are communicated from a heterogeneous system (e.g., wireless device 104) based on the comparison of the TPC report being within a threshold difference. The method then continues at 810.

Figure 13:
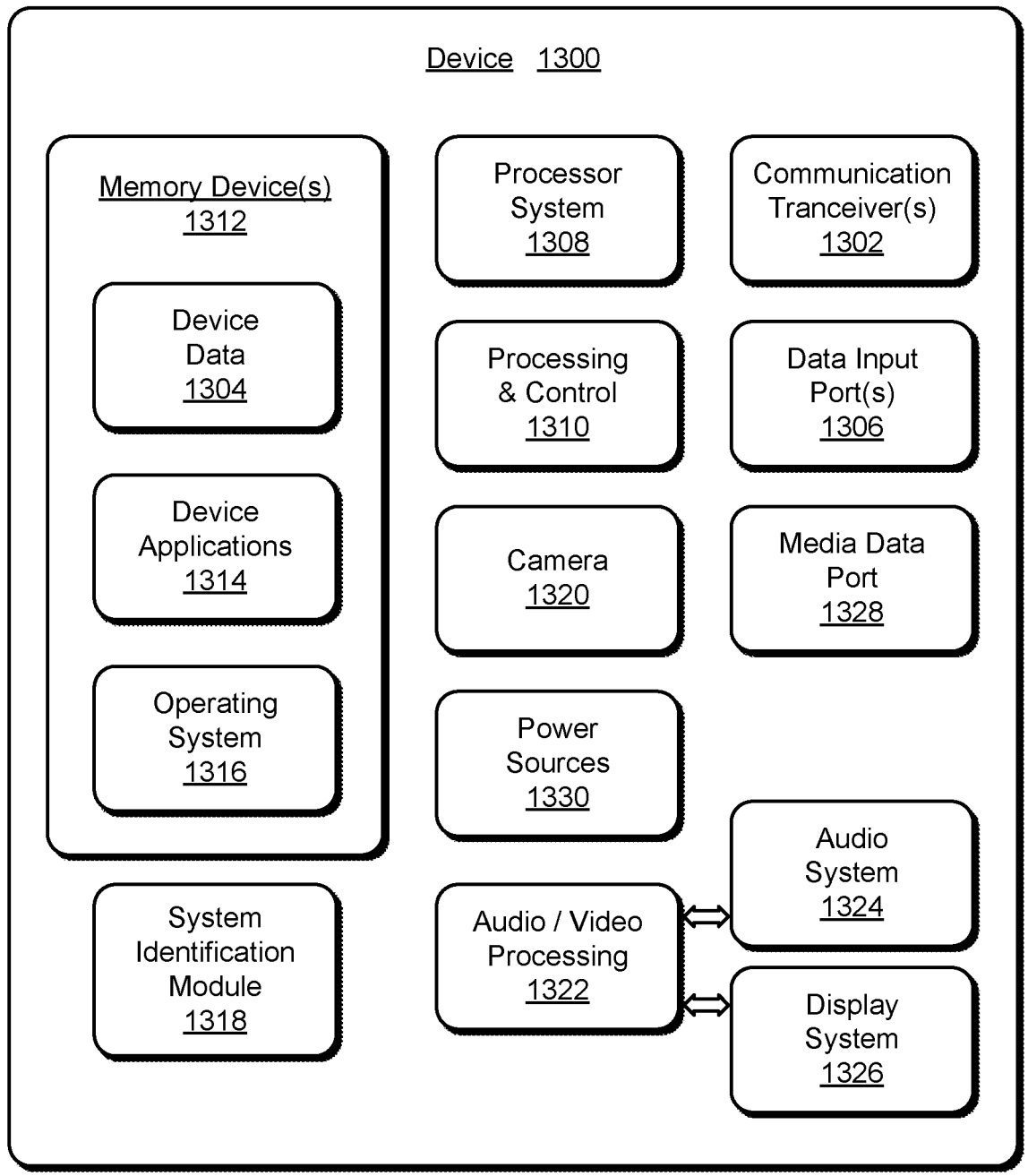
FIG. 13 illustrates various components of an example device that can implement aspects of homogeneous and heterogeneous system determination in a network, and heterogeneous system determination in a network.

FIG. 13 illustrates various components of an example device 1300, which can implement examples of homogeneous and heterogeneous system determination in a network as described herein. The example device 1300 can be implemented as any of the devices described with reference to the previous FIGS. 1-12, such as any type of mobile device, mobile phone, client device, tablet, computing, communication, entertainment, gaming, media playback, and/or other type of electronic device. For example, the computing device 102, the wireless device 104, and the wireless device 200 shown and described with reference to FIGS. 1-12 may be implemented as the example device 1300.

The device 1300 includes communication transceivers 1302 that enable wired and/or wireless communication of device data 1304 with other devices. The device data 1304 can include the management frames and the signatures of the management frames. Additionally, the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.16 (WiMAX') standards, and wired local area network (LAN) Ethernet transceivers for network data communication.

The device 1300 may also include one or more data input ports 1306 via which any type of data, media content, and/or inputs can be received, such as user-selectable inputs to the device, messages, music, television content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1300 includes a processing system 1308 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1310. The device 1300 may further include any type of a system bus or other data and command transfer system that couples the various components within the device. A system bus can include any one or combination of different bus structures and architectures, as well as control and data lines.

The device 1300 also includes computer-readable storage memory 1312 that enables data storage, such as data storage devices that can be accessed by a computing device, and that provide persistent storage of data and executable instructions (e.g., software applications, programs, algorithms, functions, and the like). Examples of the computer-readable storage memory 1312 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory devices in various memory device configurations. The device 1300 may also include a mass storage media device.

The computer-readable storage memory 1312 provides data storage mechanisms to store the device data 1304, other types of information and/or data, and various device applications 1314 (e.g., software applications). For example, an operating system 1316 can be maintained as software instructions with a memory device and executed by the processor system 1308. An example of the device applications 1314 is the first service 118 and the second service 120 of the wireless device 104. The device applications may also include a device manager, such as any form of a control application, software application, signal-processing and control module, code that is native to a particular device, a hardware abstraction layer for a particular device, and so on.

In this example, the device 1300 includes a system identification module 1318 that implements features and aspects of homogeneous system determination in a network, as well as heterogeneous system determination in a network, and may be implemented with hardware components and/or in software, such as when the device 1300 is implemented as the computing device 102 or the wireless device 200 described with reference to FIGS. 1 and 2. An example of the system identification module 1318 is the system identification module 124 implemented as a software application and/or as hardware components in the computing device 102 and the wireless device 200 as described and shown in the previous figures. In implementations, the system identification module 1318 may include independent processing, memory, and logic components as a computing and/or electronic device integrated with the example device 1300.

In this example, the device 1300 also includes a camera 1320 and an audio and/or video processing system 1322 that generates audio data for an audio system 1324 and/or generates display data for a display system 1326. An example of the display system 1326 is the display device 208 of the wireless device 200. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1328. In implementations, the audio system and/or the display system are integrated components of the example device. Alternatively, the audio system and/or the display system are external, peripheral components to the example device.

The device 1300 can also include one or more power sources 1330, such as when the device is implemented as a mobile device or portable device. The power sources may include a charging and/or power system, and can be implemented as a flexible strip battery, a rechargeable battery, a charged super-capacitor, and/or any other type of active or passive power source.

Although implementations of homogeneous and heterogeneous system determination in a network have been described in language specific to features and/or methods, the subject of the appended claims is not necessarily limited to the specific features or methods described. Rather, the specific features and methods are disclosed as example implementations of homogeneous and heterogeneous system determination in a network, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A method, comprising: receiving a first management frame and at least a second management frame communicated in separate data messages in a network, the first and the second management frames being received using a common communication protocol; detecting that the first management frame is communicated in a first data message from a radio device in the network, the first management frame being detected based on a first source address included in the first management frame; detecting that the second management frame is communicated in a second data message from the radio device in the network, the second management frame being detected based on a second source address included in the second management frame, the second source address being different than the first source address; and determining that the first management frame and the second management frame are communicated from a homogeneous system that includes the radio device in the network based at least in part on the first and the second source addresses.

Alternatively or in addition to the above described method, any one or combination of: determining to associate with the homogeneous system responsive to the first and the second management frames being communicated from the homogeneous system, the association based on an operational state of services associated with either the first or the second management frames. The determining to associate with the homogeneous system includes adding the homogeneous system to a block list based on the operational state of services associated with either the first or the second management frames being not operational, and not responding to the first and the second management frames. The determining to associate with the homogeneous system includes adding the homogeneous system to an allow list based on the operational state of services associated with either the first or the second management frames being operational, and responding to the first and the second management frames. The method further comprising: receiving a third management frame communicated in a separate data message in the network, the third management frame being received using the common communication protocol; detecting that the third management frame is communicated from a different radio device in the network, the third management frame being detected based on a third source address included in the third management frame; determining that the third management frame is communicated from a different device system that includes the different radio device based at least in part on the third source address; adding the different device system to the allow list based on the operational state of services associated with the third management frame being operational; and responding to the third management frame based on the different device system being added to the allow list. The method further comprising: determining whether the first source address and the second source address correspond to the same manufacturer; and the determining that the first management frame and the second management frame are communicated from the homogeneous system is further based on the same manufacturer corresponding to the first and the second source addresses with a non-organizationally unique identifier (non-OUI) portion. The method further comprising: obtaining received signal strength indication (RSSI) values for the first management frame and the second management frame; comparing the RSSI values between the first and the second management frames; and the determining that the first management frame and the second management frame are communicated from the homogeneous system is further based on the comparison of the RSSI values being within a threshold difference. The first management frame and the second management frame each include a transmit power control (TPC) report, and the method further comprising: comparing the TPC report of the first and the second management frames; and the determining that the first management frame and the second management frame are communicated from the homogeneous system is further based on the comparison of the TPC report of the first and the second management frames being within a threshold difference.

A method, comprising: receiving a first management frame and at least a second management frame communicated in separate data messages in a network, the first and the second management frames being received using a common communication protocol; detecting that the first management frame is communicated in a first data message from a radio device using the common communication protocol in the network, the first management frame being detected based on a first source address included in the first management frame; detecting that the second management frame is communicated in a second data message from a different radio device using the common communication protocol in the network, the second management frame being detected based on a second source address included in the second management frame; and determining that the first management frame and the second management frame are communicated from a homogeneous system that includes the radio device and the different radio device, the determining based at least in part on the first source address and the second source address corresponding to a same manufacturer.

Alternatively or in addition to the above described method, any one or combination of: determining to associate with the homogeneous system responsive to the first and the second management frames being communicated from the homogeneous system, the association based on an operational state of services associated with either the first or the second management frames. The determining to associate with the homogeneous system includes adding the homogeneous system to a block list based on the operational state of services associated with either the first or the second management frames being not operational, and not responding to the first and the second management frames. The determining to associate with the homogeneous system includes adding the homogeneous system to an allow list based on the operational state of services associated with either the first or the second management frames being operational, and responding to the first and the second management frames. The method further comprising: obtaining received signal strength indication (RSSI) values for the first management frame and the second management frame; comparing the RSSI values between the first and the second management frames; and the determining that the first management frame and the second management frame are communicated from the homogeneous system is further based on the comparison of the RSSI values being within a threshold difference. The first and the second management frames each include a transmit power control (TPC) report, and the method further comprising: comparing the TPC report of the first and the second management frames; and the determining that the first management frame and the second management frame are communicated from the homogeneous system is further based on the comparison of the TPC report of the first and the second management frames being within a threshold difference. The method further comprising: communicating with the radio device and the different radio device that transmitted the respective first and the second management frames to obtain geospatial locations for the radio device and the different radio device; and the determining that the first management frame and the second management frame are communicated from the homogeneous system is further based on the geospatial locations of the radio device and the different radio device being at a same location or within a threshold area. The method further comprising: communicating with the radio device and the different radio device that transmitted the respective first and the second management frames to determine a distance to the radio device and to the different radio device; and the determining that the first management frame and the second management frame are communicated from the homogeneous system is further based on the distance to the radio device and to the different radio device being within a threshold difference.

A device, comprising: a radio to receive data messages over a network; a memory and processor system to execute a system identification module implemented to: receive a first management frame and at least a second management frame communicated in separate data messages in the network, the first and the second management frames being received using a common communication protocol; detect that the first management frame is communicated in a first data message from a radio device in the network, the first management frame being detected based on a first source address included in the first management frame; detect that the second management frame is communicated in a second data message from the radio device in the network, the second management frame being detected based on a second source address included in the second management frame; and determine that the first management frame and the second management frame are communicated from a homogeneous system that includes the radio device based at least in part on the first and the second source addresses.

Alternatively or in addition to the above described device, any one or combination of: the system identification module is implemented to determine to associate with the homogeneous system responsive to the first and the second management frames being communicated from the radio device in the homogeneous system, the association based on an operational state of services associated with either the first or the second management frames. The determination to associate with the homogeneous system includes the system identification module implemented to add the homogeneous system to a block list based on the operational state of services associated with either the first or the second management frames being not operational, and not respond to the first and the second management frames. The determination to associate with the homogeneous system includes the system identification module implemented to add the homogeneous system to an allow list based on the operational state of services associated with either the first or the second management frames being operational, and respond to the first and the second management frames.

A method, comprising: receiving a first management frame and at least a second management frame communicated in separate data messages, the first and the second management frames being received using different communication protocols; detecting that the first management frame is communicated in a first data message from a radio device using a first communication protocol, the first management frame being detected based on a first source address included in the first management frame; detecting that the second management frame is communicated in a second data message from a different radio device using a second communication protocol, the second management frame being detected based on a second source address included in the second management frame, the second source address being different than the first source address; determining that the first management frame and the second management frame are communicated from a heterogeneous system that includes the radio device and the different radio device based at least in part on the first and the second source addresses.

Alternatively or in addition to the above described method, any one or combination of: determining to associate with the heterogeneous system responsive to the first and the second management frames being communicated from the heterogeneous system, the association based on an operational state of services associated with either the first or the second management frames. The determining to associate with the heterogeneous system includes adding the heterogeneous system to a block list based on the operational state of services associated with either the first or the second management frames being not operational, and not responding to the first and the second management frames. The determining to associate with the heterogeneous system includes adding the heterogeneous system to an allow list based on the operational state of services associated with either the first or the second management frames being operational, and responding to the first and the second management frames. The method further comprising: receiving a third management frame communicated in a separate data message, the third management frame being received using one of the first communication protocol, the second communication protocol, or a third communication protocol; detecting that the third management frame is communicated from another radio device, the third management frame being detected based on a third source address included in the third management frame; determining that the third management frame is communicated from a different device system that includes the other radio device based at least in part on the third source address; adding the different device system to the allow list based on the an operational state of services associated with the third management frame being operational; and responding to the third management frame based on the different device system being added to the allow list. The method further comprising: determining whether the first source address and the second source address correspond to the same manufacturer; and the determining that the first management frame and the second management frame are communicated from the heterogeneous system is further based on the same manufacturer corresponding to the first and the second source addresses. The method further comprising: obtaining received signal strength indication (RSSI) values for the first management frame and the second management frame; comparing the RSSI values between the first and the second management frames; and the determining that the first management frame and the second management frame are communicated from the heterogeneous system is further based on the comparison of the RSSI values being within a threshold difference. The first management frame and the second management frame each include a transmit power control (TPC) report, and the method further comprising: comparing the TPC report of the first and the second management frames; and the determining that the first management frame and the second management frame are communicated from the heterogeneous system is further based on the comparison of the TPC report of the first and the second management frames being within a threshold difference.

The invention claimed is:

1. A method, comprising:
receiving a first management frame and at least a second management frame communicated in separate data messages in a network, the first and the second management frames being received using a common communication protocol;
detecting that the first management frame is communicated in a first data message from a radio device in the network, the first management frame being detected based on a first source address included in the first management frame;
detecting that the second management frame is communicated in a second data message from the radio device in the network, the second management frame being detected based on a second source address included in the second management frame, the second source address being different than the first source address;
determining that the first management frame and the second management frame are communicated from a homogeneous system that includes the radio device in the network based at least in part on the first and the second source addresses; and
determining to associate with the homogeneous system by adding the homogeneous system to an allow list based on an operational state of services associated with either the first or the second management frames being operational, and responding to the first and second management frames.

2. The method as recited in claim 1, wherein the determining to associate with the homogeneous system is responsive to the first and the second management frames being communicated from the homogeneous system, and the association based on the operational state of the services associated with either the first or the second management frames.

3. The method as recited in claim 1, wherein, as an alternative to adding the homogeneous system to the allow list, adding the homogeneous system to a block list based on the operational state of the services associated with either the first or the second management frames being not operational, and not responding to the first and the second management frames.

4. The method as recited in claim 1, further comprising:
receiving a third management frame communicated in a separate data message in the network, the third management frame being received using the common communication protocol;
detecting that the third management frame is communicated from a different radio device in the network, the third management frame being detected based on a third source address included in the third management frame;

determining that the third management frame is communicated from a different device system that includes the different radio device based at least in part on the third source address;
adding the different device system to the allow list based on the operational state of services associated with the third management frame being operational; and
responding to the third management frame based on the different device system being added to the allow list.

5. The method as recited in claim 1, further comprising:
determining whether the first source address and the second source address correspond to the same manufacturer; and
the determining that the first management frame and the second management frame are communicated from the homogeneous system is further based on the same manufacturer corresponding to the first and the second source addresses with a non-organizationally unique identifier (non-OUI) portion.

6. The method as recited in claim 1, further comprising:
obtaining received signal strength indication (RSSI) values for the first management frame and the second management frame;
comparing the RSSI values between the first and the second management frames; and
the determining that the first management frame and the second management frame are communicated from the homogeneous system is further based on the comparison of the RSSI values being within a threshold difference.

7. The method as recited in claim 1, wherein the first management frame and the second management frame each include a transmit power control (TPC) report, and the method further comprising:
comparing the TPC report of the first and the second management frames; and
the determining that the first management frame and the second management frame are communicated from the homogeneous system is further based on the comparison of the TPC report of the first and the second management frames being within a threshold difference.

8. A method, comprising:
receiving a first management frame and at least a second management frame communicated in separate data messages in a network, the first and the second management frames being received using a common communication protocol;
detecting that the first management frame is communicated in a first data message from a radio device using the common communication protocol in the network, the first management frame being detected based on a first source address included in the first management frame;
detecting that the second management frame is communicated in a second data message from a different radio device using the common communication protocol in the network, the second management frame being detected based on a second source address included in the second management frame; and
determining that the first management frame and the second management frame are communicated from a homogeneous system that includes the radio device and the different radio device, the determining based at least in part on the first source address and the second source address having a non-organizationally unique identifier (non-OUI) portion corresponding to a same manufacturer, and the homogeneous system added to an allow list based on an operational state of services associated with either the first or the second management frames being operational.

9. The method as recited in claim 8, further comprising:
determining to associate with the homogeneous system responsive to the first and the second management frames being communicated from the homogeneous system, the association based on the operational state of services associated with either the first or the second management frames.

10. The method as recited in claim 9, wherein the determining to associate with the homogeneous system alternatively includes adding the homogeneous system to a block list based on the operational state of services associated with either the first or the second management frames being not operational, and not responding to the first and the second management frames.

11. The method as recited in claim 9, wherein the determining to associate with the homogeneous system and the homogeneous system added to the allow list includes responding to the first and the second management frames.

12. The method as recited in claim 8, further comprising:
obtaining received signal strength indication (RSSI) values for the first management frame and the second management frame;
comparing the RSSI values between the first and the second management frames; and
the determining that the first management frame and the second management frame are communicated from the homogeneous system is further based on the comparison of the RSSI values being within a threshold difference.

13. The method as recited in claim 8, wherein the first and the second management frames each include a transmit power control (TPC) report, and the method further comprising:
comparing the TPC report of the first and the second management frames; and
the determining that the first management frame and the second management frame are communicated from the homogeneous system is further based on the comparison of the TPC report of the first and the second management frames being within a threshold difference.

14. The method as recited in claim 8, further comprising:
communicating with the radio device and the different radio device that transmitted the respective first and the second management frames to obtain geospatial locations for the radio device and the different radio device; and
the determining that the first management frame and the second management frame are communicated from the homogeneous system is further based on the geospatial locations of the radio device and the different radio device being at a same location or within a threshold area.

15. The method as recited in claim 8, further comprising:
communicating with the radio device and the different radio device that transmitted the respective first and the second management frames to determine a distance to the radio device and to the different radio device; and
the determining that the first management frame and the second management frame are communicated from the homogeneous system is further based on the distance to the radio device and to the different radio device being within a threshold difference.

16. A device, comprising:

a radio to receive data messages over a network;

a memory and processor system to execute a system identification module implemented to:

receive a first management frame and at least a second management frame communicated in separate data messages in the network, the first and the second management frames being received using a common communication protocol;

detect that the first management frame is communicated in a first data message from a radio device in the network, the first management frame being detected based on a first source address included in the first management frame;

detect that the second management frame is communicated in a second data message from the radio device in the network, the second management frame being detected based on a second source address included in the second management frame;

determine that the first management frame and the second management frame are communicated from a homogeneous system that includes the radio device based at least in part on the first and the second source addresses, and determine to associate with the homogeneous system by the homogeneous system added to a block list based on an operational state of services associated with either the first or the second management frames being not operational, and not respond to the first and the second management frames.

17. The device as recited in claim 16, wherein the system identification module determines to associate with the homogeneous system responsive to the first and the second management frames being communicated from the radio device in the homogeneous system, and the association based on the operational state of the services associated with either the first or the second management frames.

18. The device as recited in claim 16, wherein the determination to associate with the homogeneous system includes wherein, as an alternative to homogenous system added to the block list, the system identification module implemented to add the homogeneous system to an allow list based on the operational state of the services associated with either the first or the second management frames being operational, and respond to the first and the second management frames.

19. The device as recited in claim 16, wherein the system identification module is implemented to:

obtain received signal strength indication (RSSI) values for the first management frame and the second management frame;

compare the RSSI values between the first and the second management frames; and determine that the first management frame and the second management frame are communicated from the homogeneous system further based on the comparison of the RSSI values being within a threshold difference.

20. The device as recited in claim 16, wherein the first and the second management frames each include a transmit power control (TPC) report, and the system identification module is implemented to:

compare the TPC report of the first and the second management frames; and determine that the first management frame and the second management frame are communicated from the homogeneous system further based on the comparison of the TPC report of the first and the second management frames being within a threshold difference.

* * * * *